(12) United States Patent
Ueda

(10) Patent No.: US 8,647,792 B2
(45) Date of Patent: Feb. 11, 2014

(54) FUEL-CELL STACK

(75) Inventor: Koji Ueda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 2003 days.

(21) Appl. No.: 11/513,216

(22) Filed: Aug. 31, 2006

(65) Prior Publication Data

US 2007/0054172 A1 Mar. 8, 2007

(30) Foreign Application Priority Data

Sep. 6, 2005 (JP) ................................ 2005-258220
Dec. 27, 2005 (JP) ................................ 2005-376532

(51) Int. Cl.
H01M 8/24 (2006.01)

(52) U.S. Cl.
USPC ........................................................ 429/470

(58) Field of Classification Search
USPC ........................................................ 429/470
See application file for complete search history.

(56) References Cited

U.S. PATENT DOCUMENTS

| 5,624,170 A | * | 4/1997 | Hasty ............................ 312/329 |
| 5,741,605 A | * | 4/1998 | Gillett et al. ................... 429/415 |
| 2005/0019643 A1 | * | 1/2005 | Sugita et al. .................... 429/34 |
| 2006/0081563 A1 | * | 4/2006 | Ueda et al. ..................... 219/119 |

FOREIGN PATENT DOCUMENTS

| JP | 4-222378 A | 8/1992 |
| JP | 11-14013 A | 1/1999 |
| JP | 11-312477 | * 12/1999 ............ B23K 11/11 |
| JP | 11 342477 A | 12/1999 |
| JP | 2005-044688 A | 2/2005 |
| JP | 2005-116227 A | 4/2005 |
| JP | 2005-193298 A | 7/2005 |

* cited by examiner

*Primary Examiner* — Patrick Ryan
*Assistant Examiner* — Muhammad Siddiquee
(74) *Attorney, Agent, or Firm* — Arent Fox LLP

(57) ABSTRACT

A fuel-cell stack includes a laminate having a plurality of unit cells laminated and accommodated in a box-like casing. The casing includes pairs of side plates arranged at the sides of the laminate and formed of a metal plate having a first thickness, and a plurality of hinge plates spot-welded to both ends of the side plates and formed of a metal plate having a second thickness greater than the first thickness. Of spot-welding electrodes, the spot-welding electrode has an end face formed with a concave. With the spot-welding electrode being arranged on the side of the hinge plate and with the hinge plate and the side plate being in press contact by the spot-welding electrodes, energization is carried out for welding.

10 Claims, 23 Drawing Sheets

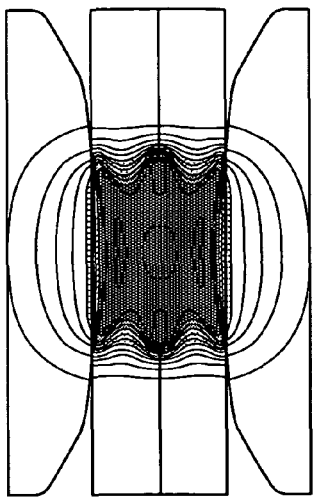
FIG. 4A3
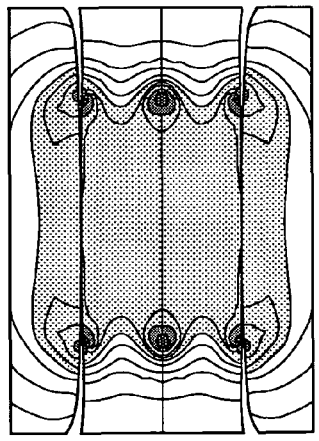
FIG. 4A2
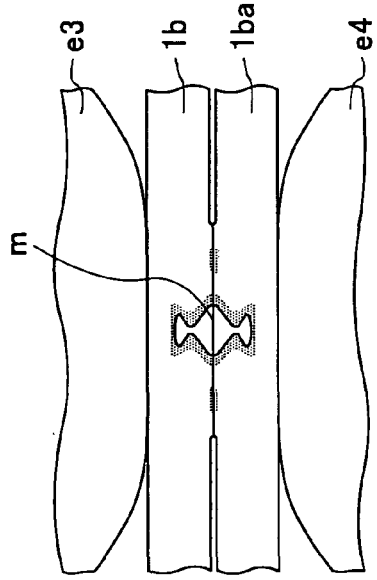
FIG. 4A1
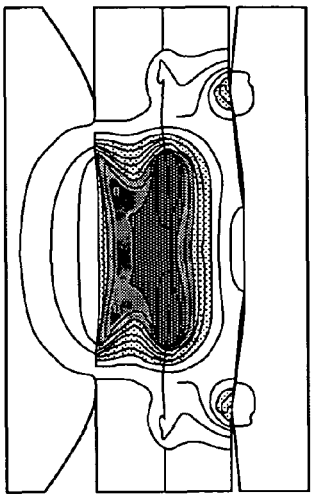
FIG. 4B3
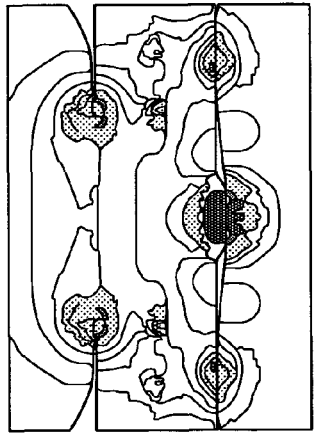
FIG. 4B2
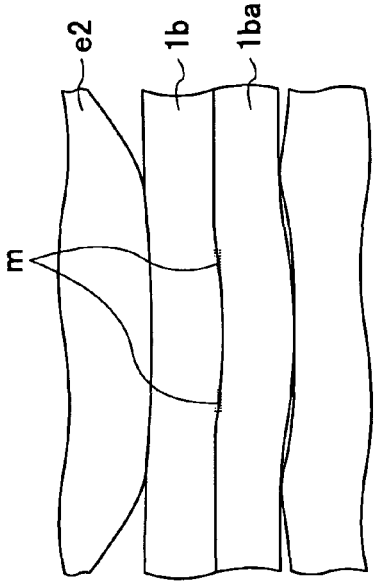
FIG. 4B1

FIG. 11A1
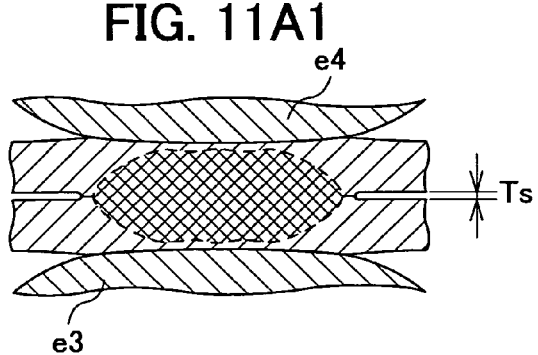
FIG. 11B1
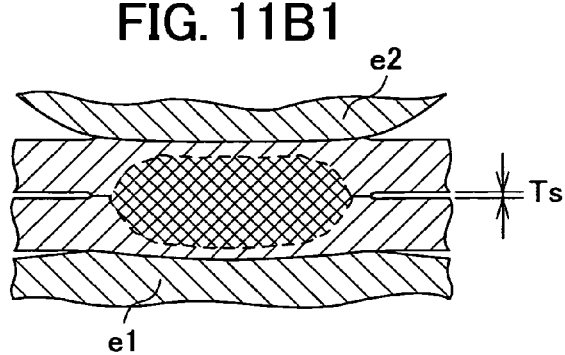
FIG. 11A2
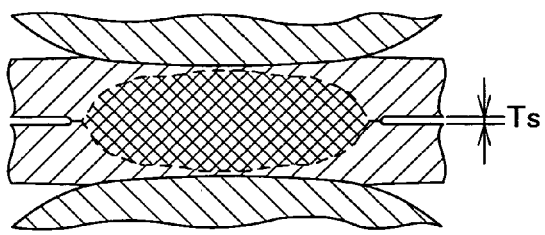
FIG. 11B2
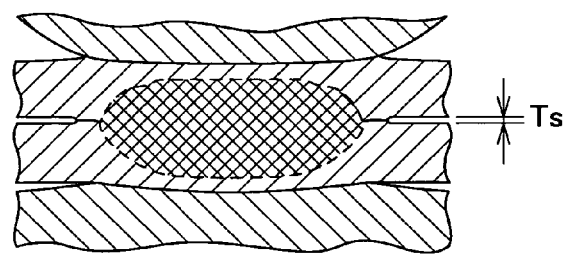
FIG. 11A3
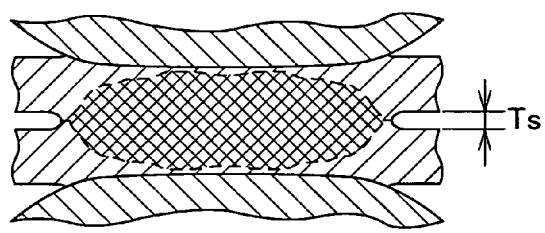
FIG. 11B3
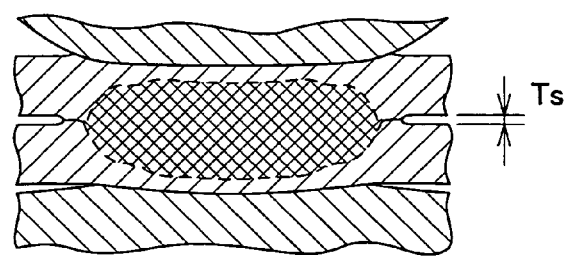

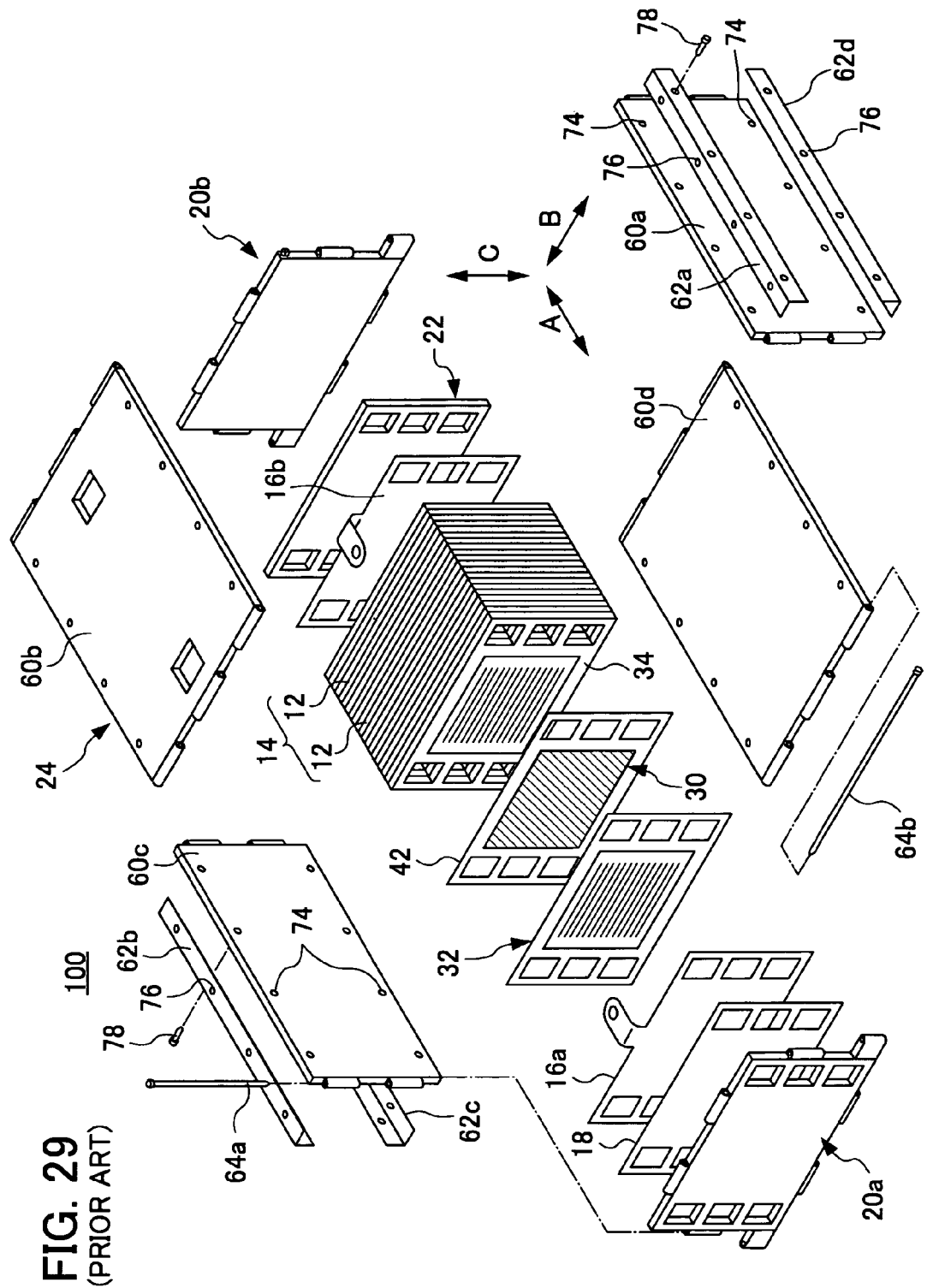

FUEL-CELL STACK

This application is based on and claims the benefit of priority from Japanese Patent Application No. 2005-258220 filed Sep. 6, 2005 and Japanese Patent Application No. 2005-376532 filed Dec. 27, 2005 as an internal priority application on the basis of Japanese Patent Application No. 2005-258220, the contents of which are hereby incorporated by reference.

FIELD OF THE INVENTION

The present invention relates to a fuel-cell stack, and more particularly, to the structure of a solid-polymer type fuel-cell stack that operates at ordinary temperatures. Such fuel-cell stack is used, for example, as a power source for electric vehicles.

BACKGROUND OF THE INVENTION

Typically, the solid-polymer type fuel-cell stack includes a unit cell in which an electrolyte/electrode structure having electrodes arranged on both sides of an electrolyte is held by metal separators. A laminate having a plurality of unit cells laminated is accommodated in a box-like casing. As this type of fuel-cell stacks, a fuel-cell stack has been invented, which allows, using metal separators, reduction in size and weight and provision of a desired power-generation performance and sealing ability to each unit cell.

With a fuel-cell stack of Japanese Unexamined Patent Application No. 2005-044688, for example, a laminate having a plurality of unit cells laminated is accommodated in a box-like casing. The casing includes first and second end plates, four side plates, four angle members for connecting adjacent ends of the four side plates, and first and second linking pins for linking the first and second end plates and the four side plates.

FIG. 29 is a perspective exploded view of the fuel-cell stack disclosed in the above publication No. 2005-044688. FIG. 29 corresponds to FIG. 1 of Japanese Unexamined Patent Application No. 2005-044688. Referring to FIG. 29, a fuel-cell stack 100 includes a laminate 14 having a plurality of unit cells 12 laminated horizontally (direction of arrow A). A terminal plate 16a, an insulating plate 18, and an end plate 20a are arranged at one end of the laminate 14 in the laminating direction (direction of arrow A) in order toward the outside. A terminal plate 16b, an insulative spacer member 22, and an end plate 20b are arranged at the other end of the laminate 14 in the laminating direction in order toward the outside. The fuel-cell 100 is integrally held by a casing 24 formed rectangularly and including end plates 20a and 20b.

Referring to FIG. 29, each unit cell 12 includes an electrolyte-film/electrode structure (electrolyte/electrode structure) 30 and first and second thin-plate corrugated metal separators 32 and 34 for holding the electrolyte-film/electrode structure 30. The electrolyte-film/electrode structure 30 includes a solid-polymer electrolyte film 42.

Referring to FIG. 29, the casing 24 includes end plates 20a and 20b, four side plates 60a to 60d arranged at the sides of the laminate 14, angle members (L-angles, for example) 62a to 62d that are connecting members for connecting adjacent ends of the side plates 60a to 60d, and linking pins 64a and 64b of different lengths for linking the end plates 20a and 20b and the side plates 60a to 60d.

The side plates 60a to 60d each are formed with a plurality of threaded holes 74 at both edges in the width direction. On the other hand, holes 76 are formed in each side of the angle members 62a to 62d to correspond to the threaded holes 74. A screw 78 inserted into each hole 76 is meshed with the threaded hole 74, thereby obtaining fixing of the side plates 60a to 60d through the angle members 62a to 62d. The casing 24 is formed in such a way. The spacer member 22 has a rectangular shape having a predetermined dimension to be positioned at the inner periphery of the casing 24. The thickness of the spacer member 22 is adjusted to absorb variation in length of the laminate 14 in the laminating direction so as to allow application of a desired fastening load to the laminate 14.

With the fuel-cell stack disclosed in the above publication No. 2005-044688, the adjacent ends of the four side plates 60a to 60d are fixed by the angle members 62a to 62d through screwing. Optionally, if a bending flange part is formed at an end of the pair of opposed side plates 60a and 60c, and ends of the pair of side plates 60b and 60d opposed to female threads arranged in the flange part are fixed through screwing, for example, the need for the angle members can be eliminated, obtaining simple structure of the casing. Moreover, if a hinge plate having a thickness greater than that of the four side plates 60a to 60d is spot-welded to both ends of the side plates 60a to 60d, a reduction in size and weight of the casing can be obtained without modifying the conventional structure. Such fuel-cell stack having reduced weight is suitably used, particularly, as a power source for electric vehicles.

Typically, when joining metal plates in the surface direction, spot welding or resistance welding is used frequently. In order to achieve a weight reduction and strength, the casing of the fuel-cell stack is formed of a stainless-steel plate or a high tensile-strength steel plate. However, when spot-welding stainless-steel plates having different thicknesses according to the conventional spot welding method, it is difficult to increase the adherence of a spot-welded part, raising a problem of difficult achievement of sufficient joining strength due to occurrence of cavities or expulsion inside the spot-welded part.

Although it can be considered to replace spot welding with laser welding or electron-beam welding, such welding is typically expensive, becoming a factor that pushes up the manufacturing cost. When spot-welding the stainless-steel plates having different thicknesses, if sufficient joining strength to a tensile-shear force and a repeated shear load can be obtained by contriving the spot-welding method, such a contrivance is preferable for the casing of the fuel-cell stack as described above, providing an advantage of allowing a reduction in junctions of spot welding. It can be said that this is a problem to be solved by the present invention.

SUMMARY OF THE INVENTION

An object of the present invention is to provide a fuel-cell stack that allows solution of the above problem. A more specific object of the present invention is to provide a fuel-cell stack including a casing having pairs of opposed side plates formed of a metal plate having a first thickness and a plurality of hinge plates welded to both ends of the pairs of the side plates by spot welding, the plurality of hinge plates being formed of a metal plate having a second thickness greater than the first thickness, wherein parts of the spot welding can provide sufficient joining strength.

In order to achieve the above objects, the inventor has devised a new fuel-cell stack obtained by the welding structure in which, of a pair of spot-welding electrodes that bring superposed junctions of a pair of metal plates constituting the casing into press contact, at least one spot-welding electrode that presses the thick metal plate has an end face formed with a concave.

According to one aspect of the present invention, there is provided a fuel-cell stack that includes: a unit cell including an electrolyte/electrode structure having electrodes arranged on both sides of an electrolyte, the electrolyte/electrode structure being held by metal separators; a box-like casing that accommodates a laminate having the unit cells laminated, the casing including: a pair of end plates arranged at both ends of the laminate in a laminating direction, pairs of side plates arranged at sides of the laminate, the pairs of side plates being formed of a metal plate having a first thickness, a plurality of hinge plates welded to both ends of the pairs of the side plates by spot welding, the plurality of hinge plates being formed of a metal plate having a second thickness greater than the first thickness, and a plurality of linking pins that link the pair of end plates and the plurality of hinge plates; and a pair of spot-welding electrodes that carry out the spot welding, at least one of the pair of spot-welding electrodes having an end face formed with a concave, the hinge plate and the side plate being welded by energization with the at least one of the pair of spot-welding electrodes being arranged on a side of the hinge plate formed of the metal plate having the second thickness and with the hinge plate and the side plate being in press contact by the pair of spot-welding electrodes.

The fuel-cell stack according to one aspect of the present invention includes a unit cell including an electrolyte/electrode structure having electrodes arranged on both sides of an electrolyte, the electrolyte/electrode structure being held by metal separators. A box-like casing accommodates a laminate having the unit cells laminated. The casing includes a pair of end plates arranged at both ends of the laminate in a laminating direction. The casing also includes pairs of side plates arranged at sides of the laminate, the pairs of side plates being formed of a metal plate having a first thickness. The casing also includes a plurality of hinge plates welded to both ends of the pairs of the side plates by spot welding, the plurality of hinge plates being formed of a metal plate having a second thickness greater than the first thickness.

Moreover, the casing includes a plurality of linking pins that link the pair of end plates and the plurality of hinge plates. The pair of end plates are connected to the hinge plates through the linking pins so as to close the openings at both ends of the pairs of side plates formed like a rectangular tube. In such a way, the casing is assembled with the laminate being accommodated therein. Optionally, L-angles as alternatives for hinge plates may be spot-welded at both ends of the side plates, and the pairs of side plates with L-angles formed like a rectangular tube and the pair of end plates may be connected to each other through screwing.

Preferably, in the casing, terminal plates are arranged at both ends of the laminate in the laminating direction, and an insulative spacer member is interposed between at least one terminal plate and one end plate. With this, even if the length of the laminate in the laminating direction varies, variation in length of the laminate can surely be absorbed by merely adjusting the thickness of the insulative spacer member.

Although the pairs of side plates each formed of a metal plate are preferably reduced in thickness to reduce the weight of the casing, a thickness reduction causes insufficient strength to a bending moment. For example, the side plates each formed of a metal plate having smaller thickness may provide a plurality of convex ribs by press working, by which insufficient strength to a bending moment can be complemented. The thickness of the hinge plates spot-welded to the side plates is greater than that of the side plates, wherein the thicknesses of the side plate and hinge plate are set suitably.

It is noted that one pair of side plates are not limited to having the same thickness. Likewise, the other pair of side plates are not limited to having the same thickness. Four side plates oppositely arranged around the laminate may include three thin plates having the same thickness and one thick plate. For example, the side plate serving as a bottom may be formed of a thick metal plate. The present invention produces an effect when a pair of metal plates are spot-welded wherein the thickness of one metal plate is smaller than that of the other metal plate. For example, a metal plate having first thickness and a metal plate having second thickness may differ in thickness more than twice as much or have the same thickness.

The fuel-cell stack according to one aspect of the present invention further includes a pair of spot-welding electrodes, at least one of which having an end face formed with a concave. The hinge plate and the side plate are welded by energization with one spot-welding electrode being arranged on a side of the hinge plate and with the hinge plate and the side plate being in press contact by the pair of spot-welding electrodes.

For example, one pair of side plates includes flange parts having both ends bent orthogonally, with which female threads are formed. Both ends of the other pair of side plates are engaged through screwing. Preferably, in view of obtaining the strength to a torsion and a bending moment, one pair of side plates each include a metal thin plate and have flange parts or bent pieces. The hinge plates each have one end formed with a curled tab and the other end formed with a flat part. The flat parts are spot-welded to both ends of the side plates in the length direction so that the tabs extend from both ends of the side plates in the length direction. The linking pins are arranged through tabs of the side plates and tabs of the end plates, connecting the pair of end plates and the plurality of hinge plates.

Of the pair of spot-welding electrodes for carrying out welding by energization with both ends of the hinge plate and the side plate being in press contact, one spot-welding electrode that presses the hinge plate formed of a metal plate having a thickness greater than that of the side plate has an end face formed with a concave, thus allowing creation of a large-area contact face between the superposed metal plates when viewed from the electrode. For example, a pair of conventional spot-welding electrodes each have an end face formed with a convex, thus creating a punctiform contact face between the superposed metal plates when viewed from the electrode. Such punctiform contact face provides smaller contact area, and current is concentrated thereon, leading to increased probability of occurrence of expulsion. According to one aspect of the present invention, excessive concentration of current can be restrained by the large-area contact face, obtaining restrained occurrence of expulsion. Moreover, increased area of the melted portion allows enhancement in welding strength as well as reduction in junctions of spot welding.

Moreover, the fuel-cell stack according to one aspect of the present invention may include grooves formed in the concave formed in an end face of one of the pair of spot-welding electrodes for spot-welding the hinge plate and the side plate each formed of a metal plate, the groove serving to divert welding current. For example, the grooves may be radial grooves passing through the center of the bottom of the concave. Since welding current is diverted by the grooves, a plurality of melted portions will occur and grow between the pair of electrodes, which will incorporate with each other after growth, forming a welding nugget. Consequently, no expulsion occurs to further enhance the welding strength. Moreover, the radial grooves allow symmetric division of a curved surface, leading to more uniform diversion of welding current.

Furthermore, using the pair of spot-welding electrodes including one electrode having an end face formed with a concave and the other electrode having an end face formed with a convex, test pieces obtained by spot-welding metal plates having the same thickness were subjected to fatigue tests. Consequently, a remarkable enhancement in shear-fatigue strength was obtained when compared with test pieces spot-welded using the pair of conventional spot-welding electrodes each having an end face formed with a convex. The test pieces spot-welded using a pair of spot-welding electrodes having end faces formed with a concave and a convex provide reduced clearance between base materials (sheet separation) when compared with the test pieces obtained by conventional spot welding. Consequently, it is supposed that a bending moment acting on the melted portion is reduced.

In such a way, the fuel-cell stack according to one aspect of the present invention is a fuel-cell stack that includes a casing including: pairs of opposed side plates formed of a metal plate having a first thickness, a plurality of hinge plates welded to both ends of the pairs of the side plates by spot welding and formed of a metal plate having a second thickness greater than the first thickness, wherein, of the pair of spot-welding electrodes for carrying out welding by energization with the hinge plate and the side plate being in press contact, one spot-welding electrode that presses the hinge plate formed of a metal plate having second thickness has an end face formed with a concave, reducing sheet separation between the hinge plate and the side plate, allowing enhancement in strength to shear fatigue due to repeated load.

According to another aspect of the present invention, the other of the pair of spot-welding electrodes has an end face formed with a convex, the hinge plate and the side plate being welded by energization with the other of the pair of spot-welding electrodes being arranged on a side of the side plate and with the hinge plate and the side plate being in press contact by the pair of spot-welding electrodes.

The fuel-cell stack according to another aspect of the present invention is configured so that the other of the pair of spot-welding electrodes has an end face formed with a convex. The hinge plate and the side plate are welded by energization with the other of the pair of spot-welding electrodes being arranged on a side of the side plate and with the hinge plate and the side plate being in press contact by the pair of spot-welding electrodes.

In such a way, the hinge plate and the side plate are welded by energization with the hinge plate and the side plate being in press contact by the pair of spot-welding electrodes including one electrode having an end face formed with a concave and the other electrode having an end face formed with a convex. With such spot welding, in the pressing/energization process, the outer periphery of the crest of the concave and the outer periphery of the convex are pressed to each other and deformed plastically toward the concave, allowing creation of a large-area contact circle with excellent adherence surrounded by the outer periphery of the crests of the metal plates as superposed. Next, in the melting process, a melted portion can be expanded toward the concave to enlarge the melt diameter from a substantial center of the contact circle. In the solidifying process, it was confirmed that the melted portion was being solidified with minimum sheet separation occurring during typical welding solidification/shrinkage. Then, occurrence of expulsion is restrained.

According to another aspect of the present invention, the side plate and the hinge plate differ in thickness more than twice as much.

The fuel-cell stack according to another aspect of the present invention is configured so that the first thickness of the side plate formed of a metal plate and the second thickness of the hinge plate formed of a metal plate differ more than twice as much.

According to another aspect of the present invention, the side plate and the hinge plate are made of stainless steel.

The fuel-cell stack according to another aspect of the present invention is configured so that the side plate formed of a metal plate having first thickness and the hinge plate formed of a metal plate having second thickness are made of stainless steel.

According to another aspect of the present invention, the side plate and the hinge plate have the same thickness.

The fuel-cell stack according to another aspect of the present invention is configured so that the first thickness of the side plate formed of a metal plate and the second thickness of the hinge plate formed of a metal plate ate the same.

According to another aspect of the present invention, the side plate and the hinge plate are made of high tensile-strength steel.

The fuel-cell stack according to another aspect of the present invention is configured so that the side plate formed of a metal plate having first thickness and the hinge plate formed of a metal plate having second thickness are made of high tensile-strength steel.

According to still another aspect of the present invention, there is provided a method of manufacturing a fuel-cell stack that includes a unit cell including an electrolyte/electrode structure having electrodes arranged on both sides of an electrolyte, the electrolyte/electrode structure being held by metal separators, and a box-like casing that accommodates a laminate having the unit cells laminated, the method including: a first step of preparing, in order for the casing to oppositely be arranged around the laminate, pairs of side plates arranged at sides of the laminate, the pairs of side plates being formed of a metal plate having a first thickness, and a plurality of hinge plates welded to both ends of the pairs of the side plates by spot welding, the plurality of hinge plates being formed of a metal plate having a second thickness greater than the first thickness; a second step of superposing the plurality of hinge plates on the both ends of the pairs of side plates; a third step of arranging a pair of spot-welding electrodes including one electrode having an end face formed with a concave and the other electrode having an end face formed with a convex, the one electrode being arranged on a side of the hinge plate, the other electrode being arranged on a side of the side plate; a fourth step of plastically deforming the hinge plate and the side plate by holding the pair of spot-welding electrodes; and a fifth step of welding the hinge plate and the side plate by energization while the pair of spot-welding electrodes presses the hinge plate and the side plate.

In the method according to still another aspect of the present invention, the side plate and the hinge plate differ in thickness more than twice as much.

In the method according to still another aspect of the present invention, the side plate and the hinge plate are made of stainless steel.

In the method according to still another aspect of the present invention, the side plate and the hinge plate have the same thickness.

In the method according to still another aspect of the present invention, the side plate and the hinge plate are made of high tensile-strength steel.

The fuel-cell stack according to the present invention is a fuel-cell stack that includes a casing including: pairs of opposed side plates formed of a metal plate having a first thickness, a plurality of hinge plates welded to both ends of the pairs of the side plates by spot welding and formed of a metal plate having a second thickness greater than the first thickness, wherein, of the pair of spot-welding electrodes for carrying out welding by energization with the hinge plate and the side plate being in press contact, one spot-welding electrode that presses the hinge plate formed of a metal plate having second thickness has an end face formed with a concave, thus allowing creation of a large-area contact face between the superposed metal plates when viewed from the electrode. Moreover, increased area of the melted portion allows enhancement in welding strength as well as reduction in junctions of spot welding. Furthermore, sheet separation is reduced between the hinge plate and the side plate, allowing enhancement in strength to shear fatigue due to repeated load.

BRIEF DESCRIPTION OF THE DRAWINGS

FIGS. 4A1 to 4B3 are sectional views of a pair of test pieces having the same thickness, wherein a comparison is made between the welding mechanism of conventional spot welding shown in FIGS. 4A1 to 4A3 and that of spot welding of the present invention shown in FIGS. 4B1 to 4B3;

FIGS. 8A and 8B are views representing a method of measuring a distortion of the metal plates welded by spot welding of the present invention, using the actual device, wherein FIG. 8A is a plan view seen from the side plate formed of a thin metal plate, and FIG. 8B is a right side view of FIG. 8A;

FIGS. 11A1 to 11B3 are sectional views of a pair of test pieces, wherein FIGS. 11A1 to 11A3 show sheet separation of a pair of test pieces obtained by conventional spot welding, and FIGS. 11B1 to 11B3 show sheet separation of a pair of test pieces obtained by spot welding of the present invention;

FIGS. 16A and 16B show positions and distorting directions of distortion gauges placed on the pair of tensile-shear test pieces shown in FIG. 13, respectively, wherein FIG. 16A is a front view, and FIG. 16B is a side view;

FIGS. 18A and 18B are graphs showing results of static tensile tests carried out with the tensile test machine shown in FIG. 14, respectively, wherein FIG. 18A shows a tensile load vs. distortion curve of conventional spot welding, and FIG. 18B shows a tensile load vs. distortion curve of spot welding of the present invention;

FIGS. 24A and 24B show positions and distorting directions of the distortion gauges placed on the pair of tensile-shear test pieces shown in FIG. 13, respectively, wherein FIG. 24A is a front view, and FIG. 24B is a side view;

FIG. 29 is a perspective exploded view of a fuel-cell stack according to the conventional art.

DETAILED DESCRIPTION OF THE INVENTION

Figure 1:
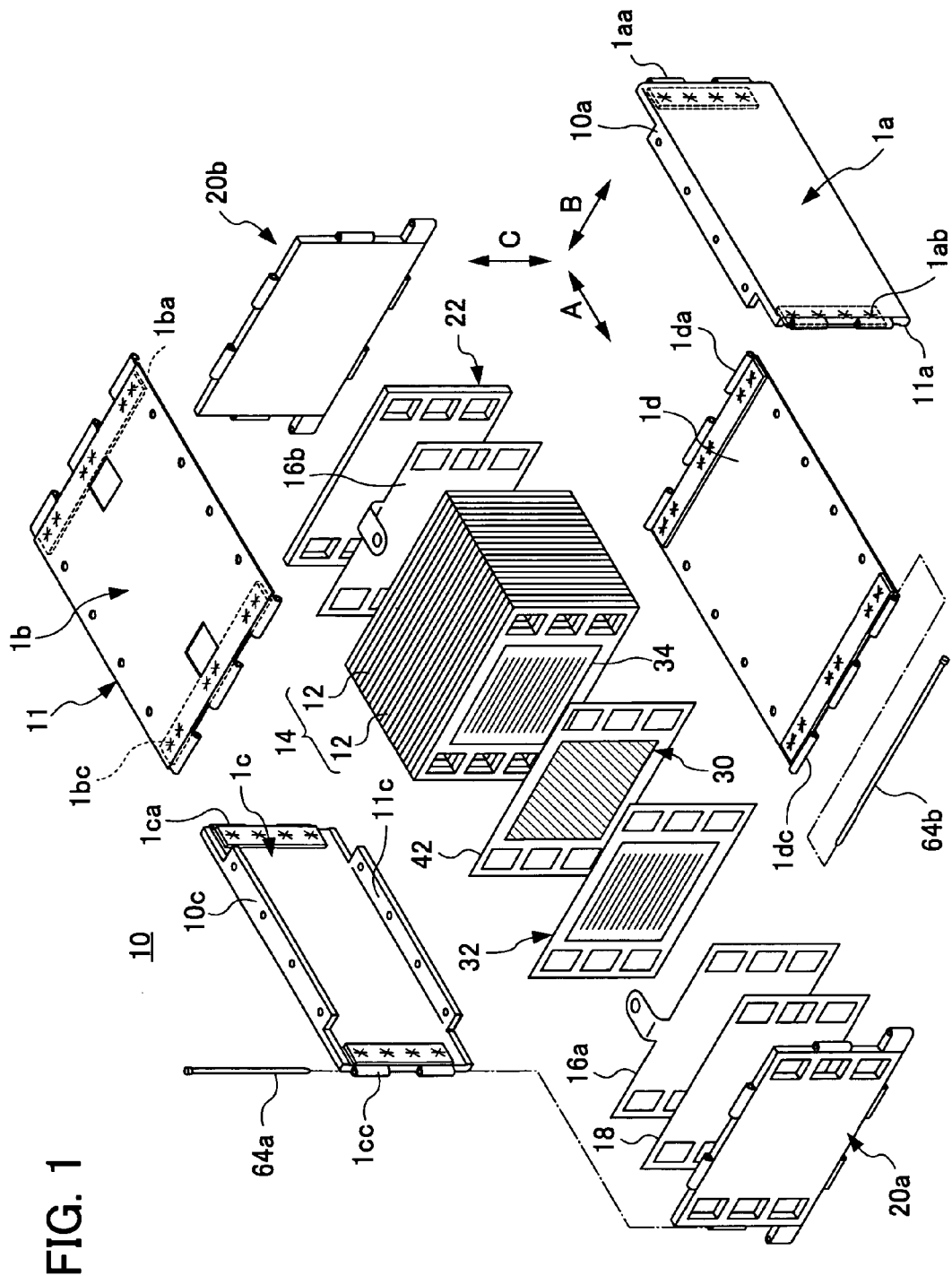
FIG. 1 is a perspective exploded view showing an embodiment of a fuel-cell stack according to the present invention.

Referring to the drawings, the best mode for carrying out the present invention will be described hereafter.

Figure 2:
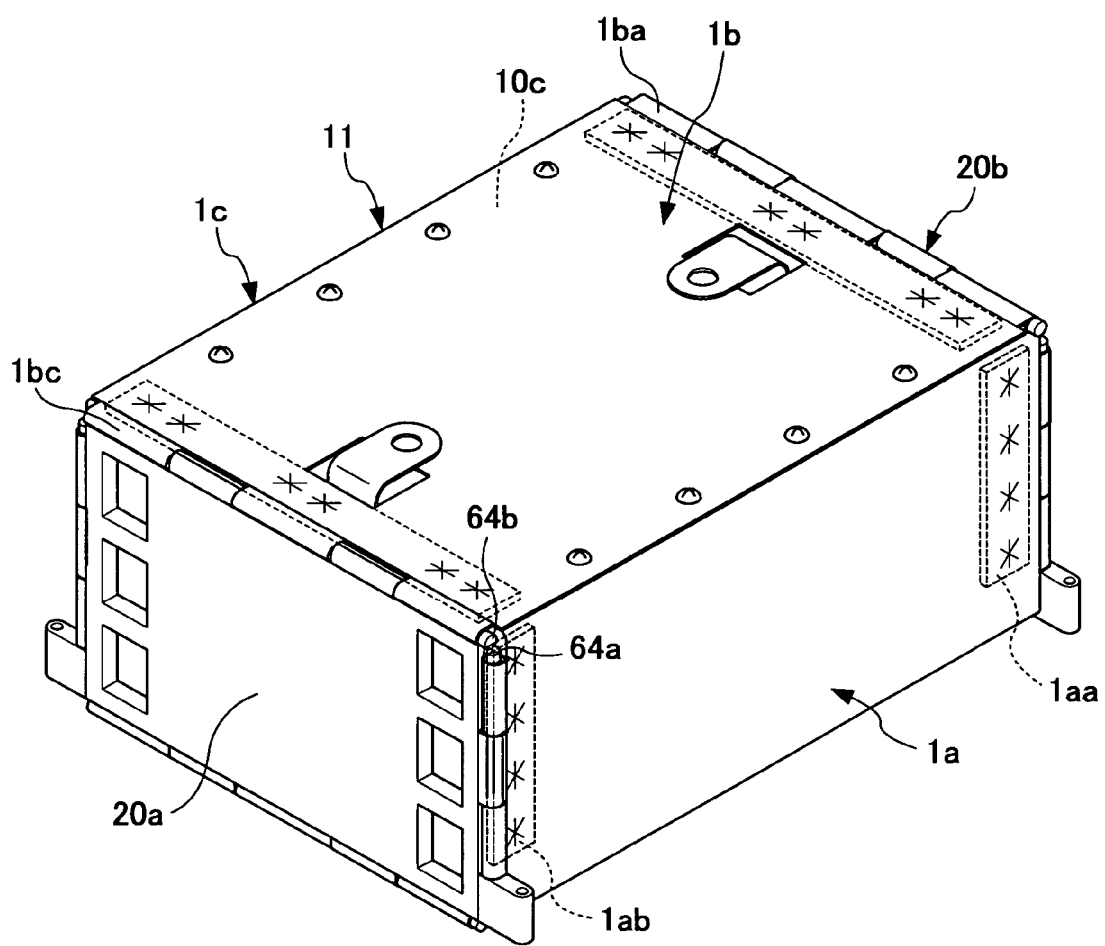
FIG. 2 is a perspective external view of the fuel-cell stack according to the embodiment shown in FIG. 1.
Figure 3A:
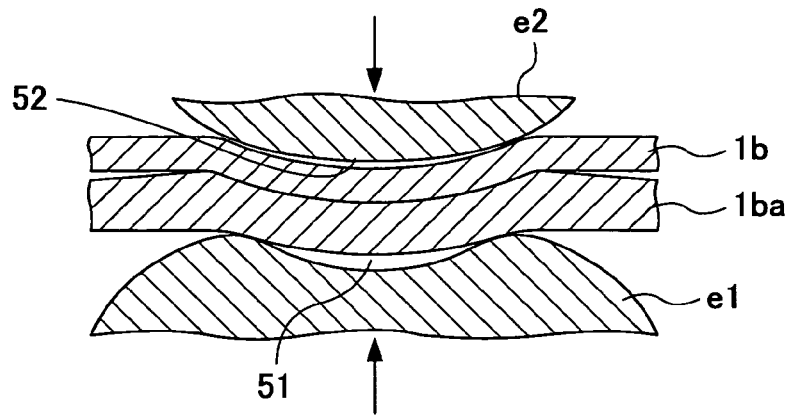
FIGS. 3A to 3C are views showing in order the processes of spot-welding metal plates of the fuel-cell stack according to the embodiment.
Figure 3B:
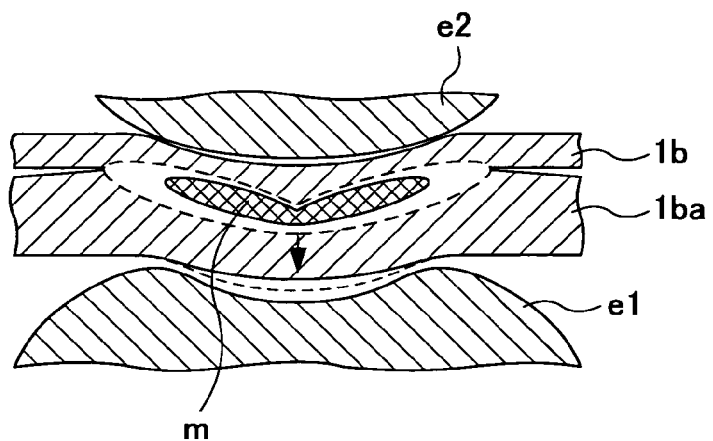
Figure 3C:
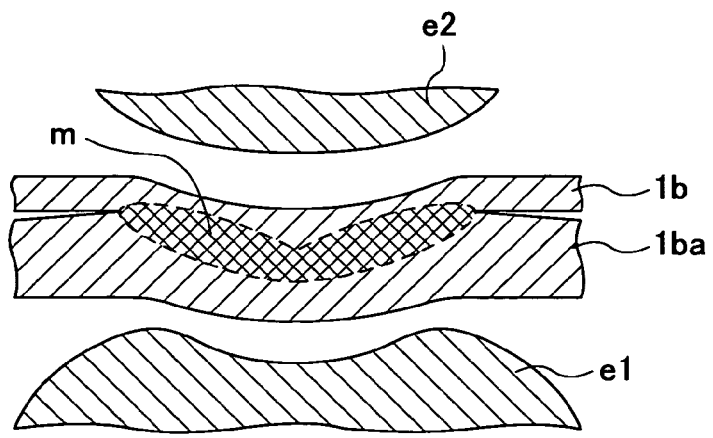

FIG. 1 is a perspective exploded view showing an embodiment of a fuel-cell stack according to the present invention. FIG. 2 is a perspective external view of the fuel-cell stack according to the embodiment. FIGS. 3A to 3C are layout diagrams when spot-welding metal plates of the fuel-cell stack according to the embodiment, and show in order the manufacturing processes with spot welding according to the present invention.

Figure 5A:
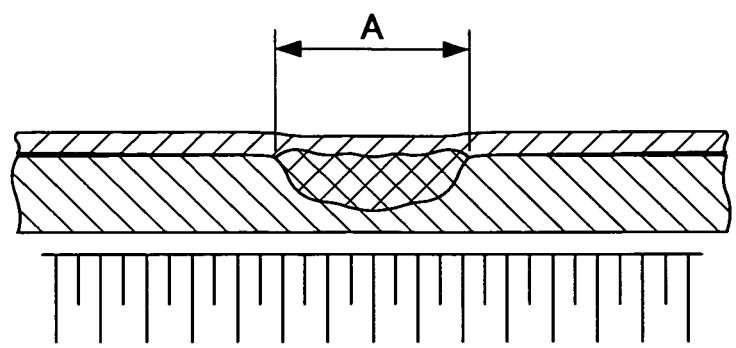
FIG. 5A is a sectional view of a pair of metal plates having different thicknesses and welded by conventional spot welding.
Figure 5B:
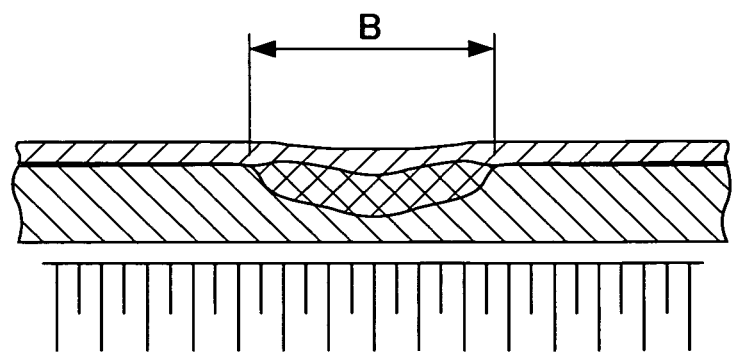
FIG. 5B is a sectional view of a pair of metal plates having different thicknesses and welded by spot welding of the present invention.
Figure 6:
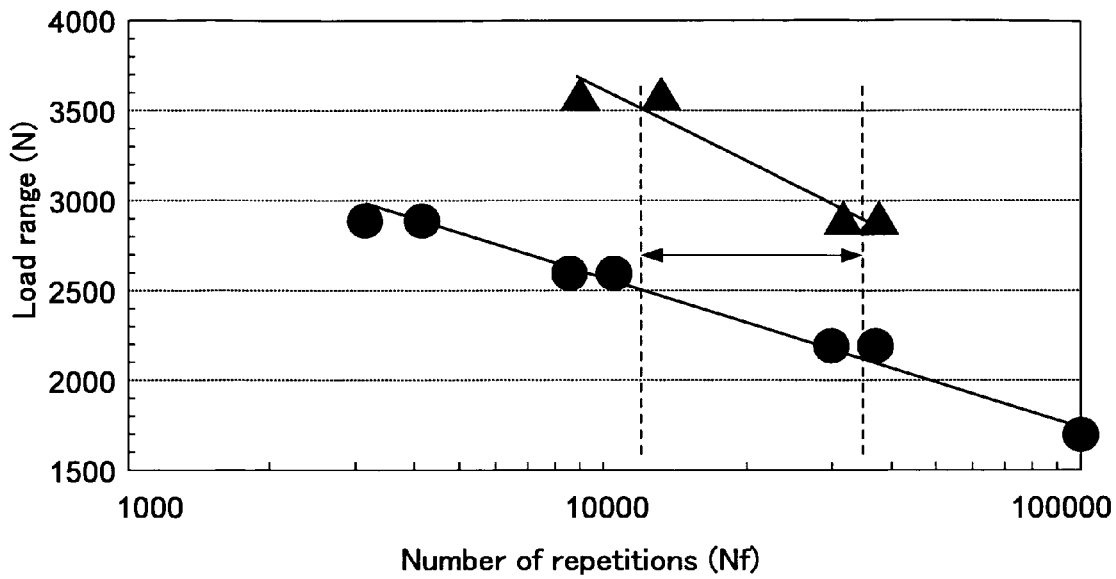
FIG. 6 is a graph for making a comparison between fatigue failure of conventional spot welding and that of spot welding of the present invention, using a pair of test pieces having different thicknesses.

FIGS. 4A1 to 4B3 are sectional views of a pair of test pieces having the same thickness, wherein a comparison is made between the welding mechanism of conventional spot welding shown in FIGS. 4A1 to 4A3 and that of spot welding of the present invention shown in FIGS. 4B1 to 4B3. FIG. 5A is a sectional view of a pair of metal plates having different thicknesses and welded by conventional spot welding, and FIG. 5B is a sectional view of a pair of metal plates having different thicknesses and welded by spot welding of the present invention, whereby a comparison is made between the melt diameter obtained by conventional spot welding and that obtained by spot welding of the present invention. FIG. 6 is a graph for making a comparison between fatigue failure of conventional spot welding and that of spot welding of the present invention, using a pair of test pieces having different thicknesses, where the vertical axis shows a repeated tensile-shear load (N), and the horizontal axis shows a number of repetitions (Nf) in a log scale.

Figure 7:
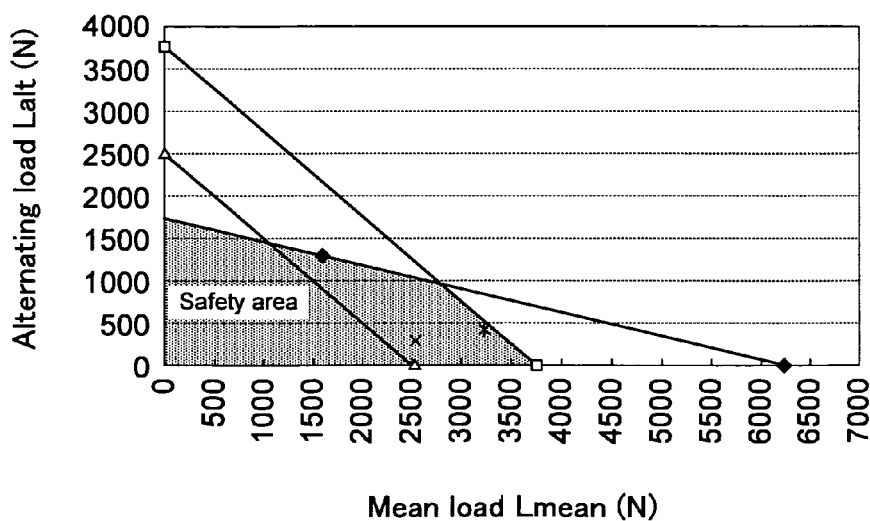
FIG. 7 is a graph for making a comparison between a fatigue limit of conventional spot welding and that of spot welding of the present invention, using an actual device.
Figure 8A:
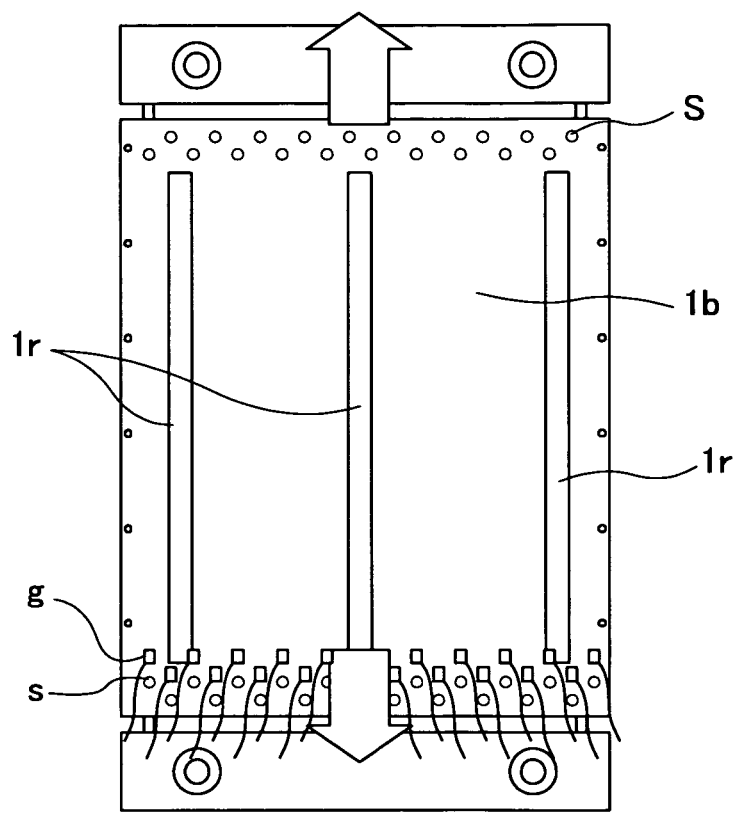
Figure 8B:
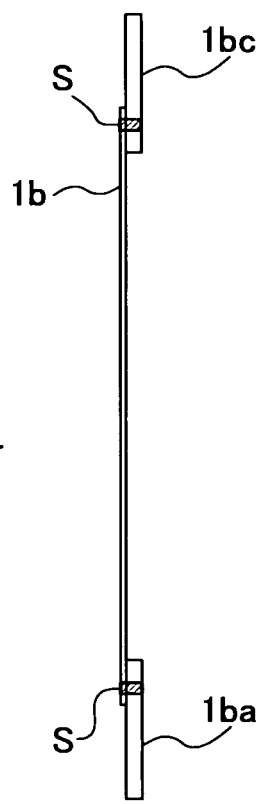
Figure 9:
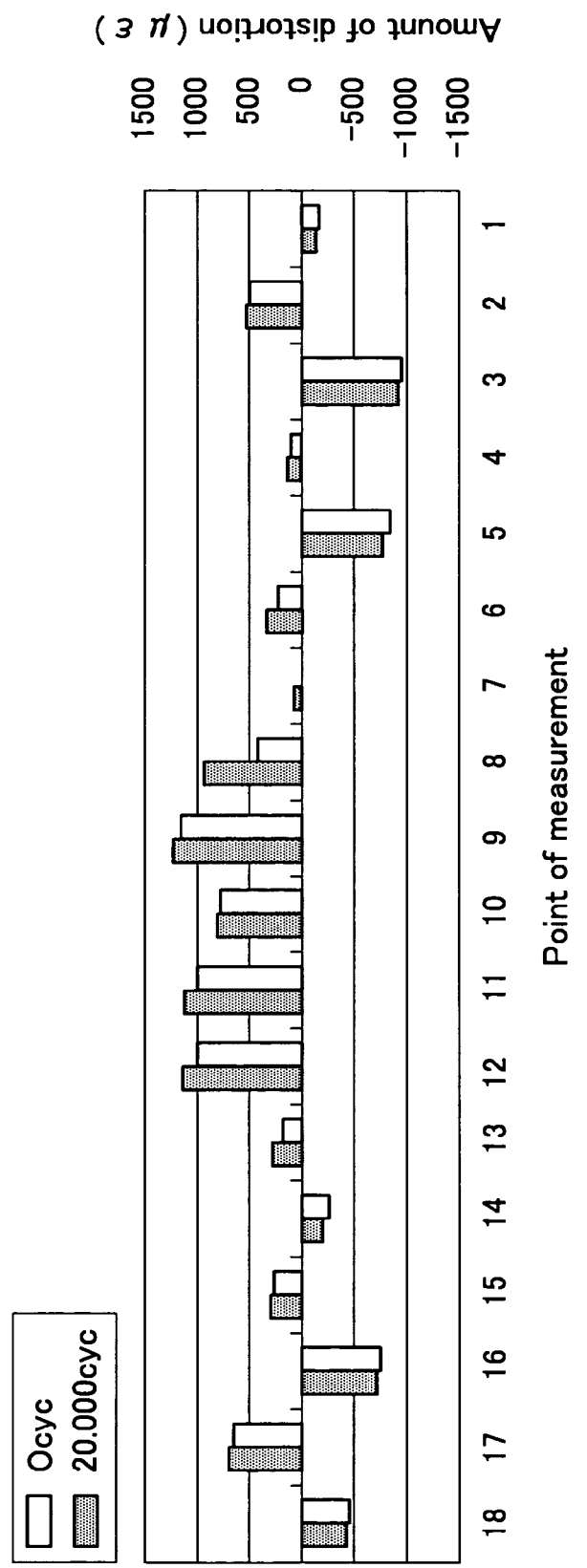
FIG. 9 is a bar graph for making a comparison between a fatigue limit of conventional spot welding and that of spot welding of the present invention, using the actual device.
Figure 10A:
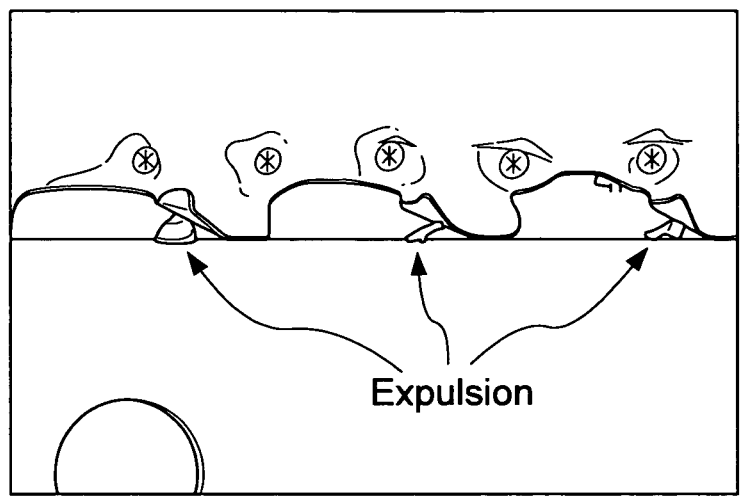
FIGS. 10A and 10B are views for making a comparison between the state of occurrence of expulsion caused by conventional spot welding and the state of occurrence of expulsion caused by spot welding of the present invention, using fatigue-failure test pieces.
Figure 10B:
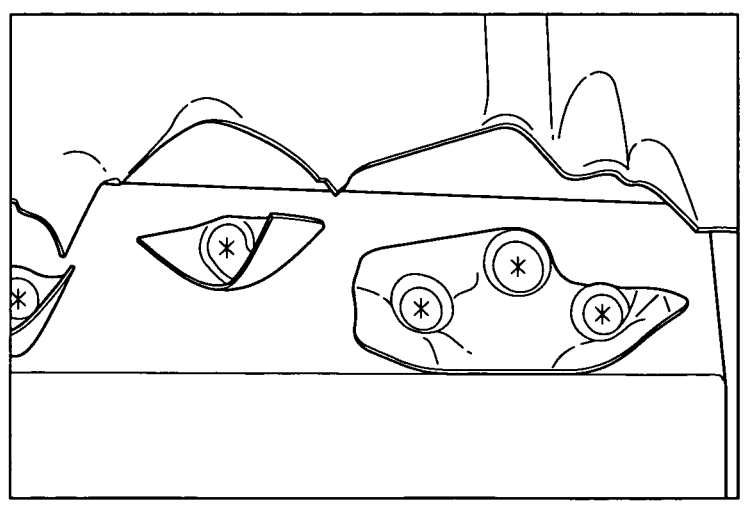

FIG. 7 is a graph for making a comparison between a fatigue limit of conventional spot welding and that of spot welding of the present invention, using an actual device in which a hinge plate formed of a thick metal plate is spot-welded to a side plate formed of a thin metal plate. FIGS. 8A and 8B are views representing a method of measuring a distortion of the metal plates welded by spot welding of the present invention, using the actual device, wherein FIG. 8A is a plan view seen from the side plate formed of a thin metal plate, and FIG. 8B is a right side view of FIG. 8A. FIG. 9 is a graph for making a comparison between a fatigue limit of conventional spot welding and that of spot welding of the present invention, using the actual device. FIGS. 10A and 10B are views for making a comparison between the state of occurrence of expulsion caused by conventional spot welding and the state of occurrence of expulsion caused by spot welding of the present invention, using fatigue-failure test pieces.

Figure 12:
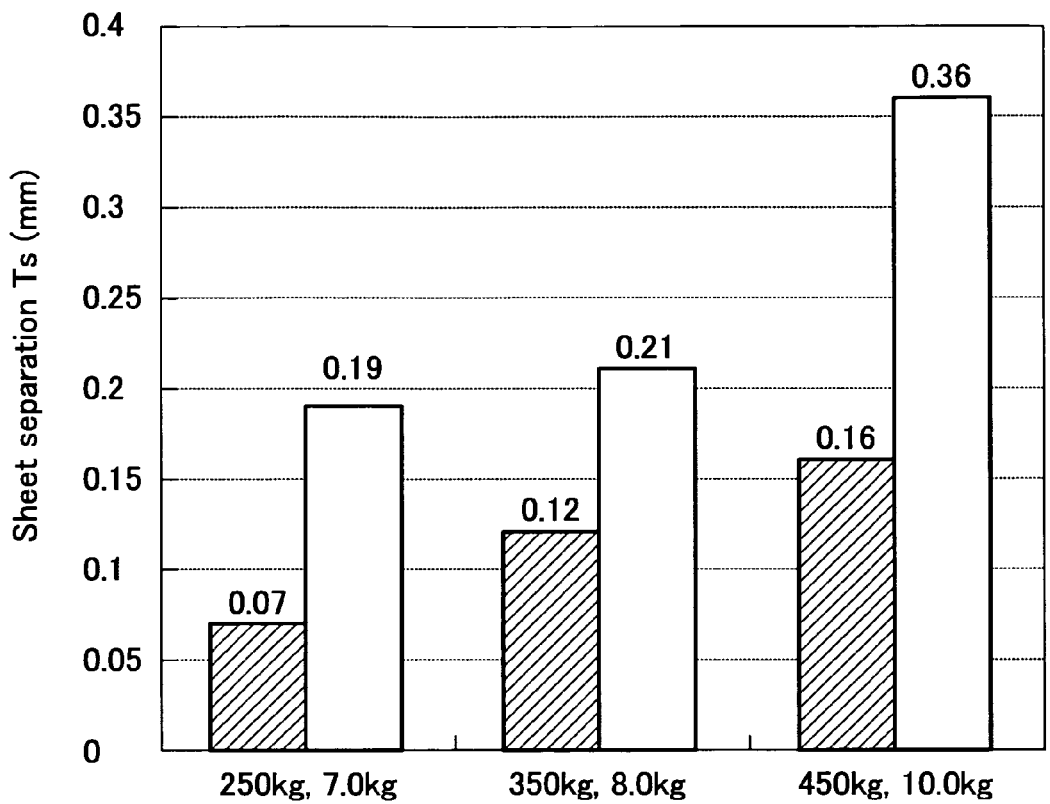
FIG. 12 is a bar graph showing results obtained through the comparison tests associated with FIG. 11.
Figure 13:
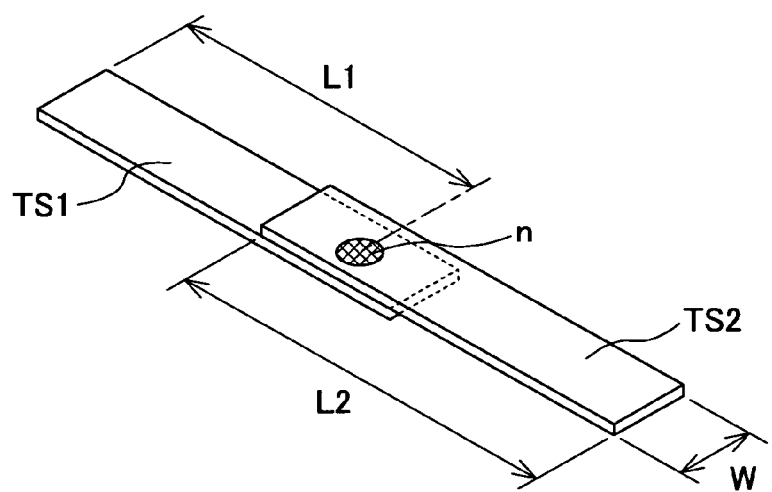
FIG. 13 is an external view showing a pair of tensile-shear test pieces according to the present invention.
Figure 14:
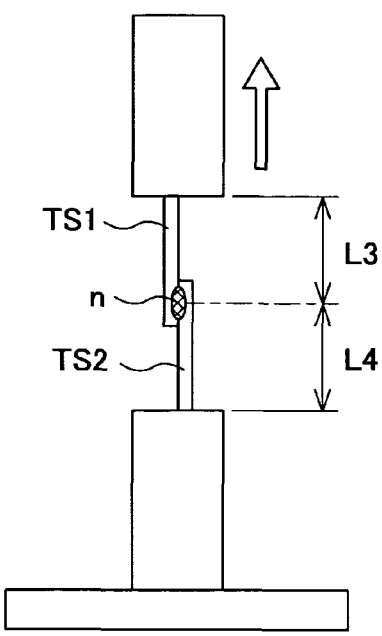
FIG. 14 is a front view of a tensile test machine for testing the pair of tensile-shear test pieces shown in FIG. 13.

FIGS. 11A1 to 11B3 are sectional views of a pair of test pieces, wherein FIGS. 11A1 to 11A3 show sheet separation of a pair of test pieces obtained by conventional spot welding, and FIGS. 11B1 to 11B3 show sheet separation of a pair of test pieces obtained by spot welding of the present invention. FIG. 12 is a bar graph showing results obtained through the comparison tests associated with FIG. 11, where the vertical axis shows sheet separation Ts (mm). FIG. 13 is an external view showing a pair of tensile-shear test pieces used to obtain a difference between spot welding of the present invention and that of the conventional art. FIG. 14 is a front view of a tensile test machine for testing the pair of tensile-shear test pieces shown in FIG. 13.

Figure 15A:
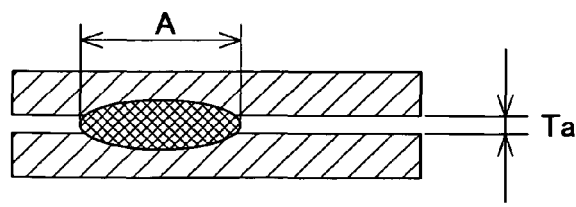
FIGS. 15A and 15B are sectional views of the pair of tensile-shear test pieces having the same thickness.
Figure 15B:
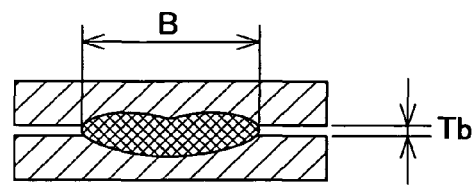
Figure 16A:
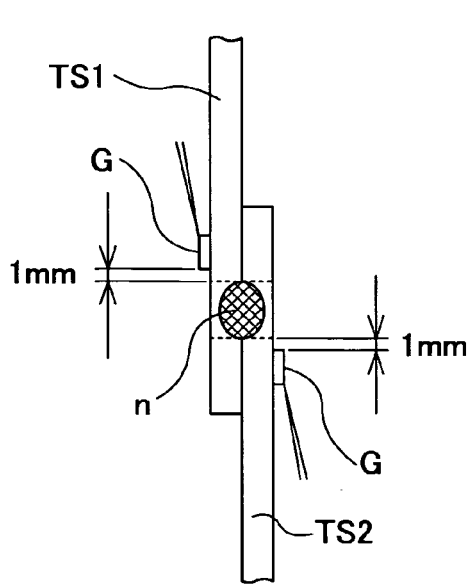
Figure 16B:
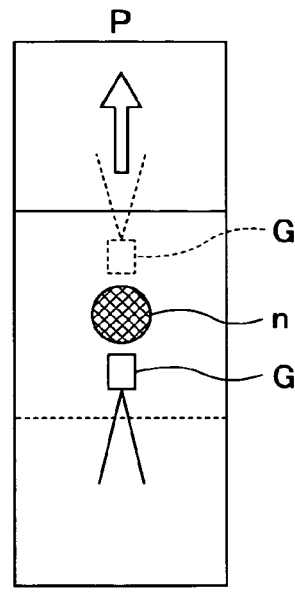
Figure 17A:
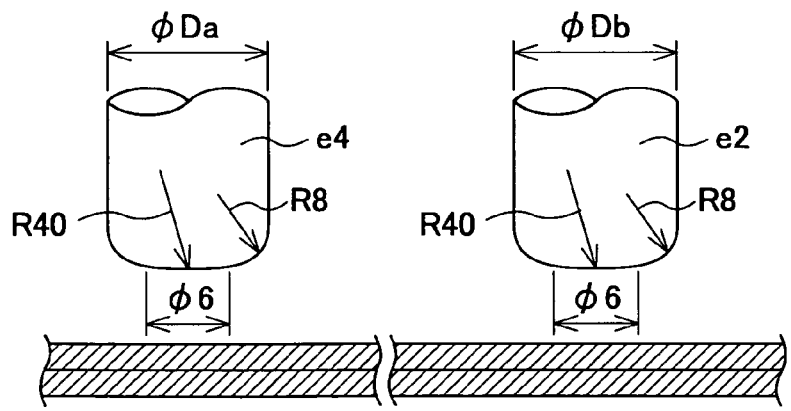
FIGS. 17A and 17B are longitudinal sectional views contrastedly showing the shape of an end of a pair of spot-welding electrodes according to the conventional art and the shape of an end of a pair of spot-welding electrodes according to the present invention, respectively.
Figure 17B:
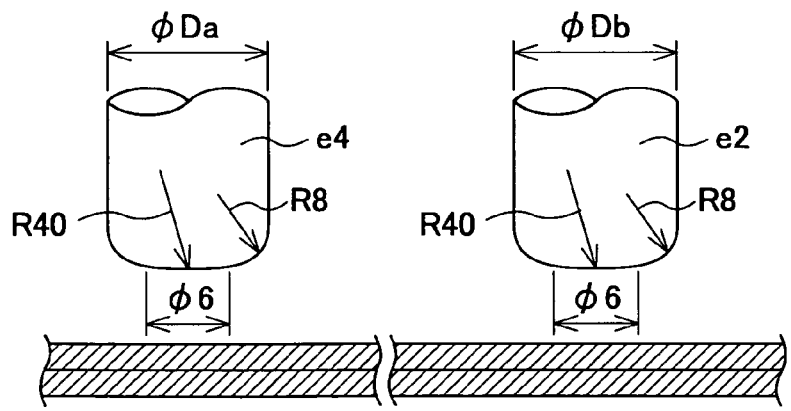

FIGS. 15A and 15B are sectional views of the pair of tensile-shear test pieces having the same thickness, wherein FIG. 15A is a sectional view of the pair of tensile-shear test pieces obtained by conventional spot welding, and FIG. 15B is a sectional view of the pair of tensile-shear test pieces obtained by spot welding of the present invention. FIGS. 16A and 16B show positions and distorting directions of distortion gauges placed on the pair of tensile-shear test pieces shown in FIG. 13, respectively, wherein FIG. 16A is a front view, and FIG. 16B is a side view. FIGS. 17A and 17B are longitudinal sectional views contrastedly showing the shape of an end of a pair of spot-welding electrodes according to the conventional art and the shape of an end of a pair of spot-welding electrodes according to the present invention, respectively.

Figure 18A:
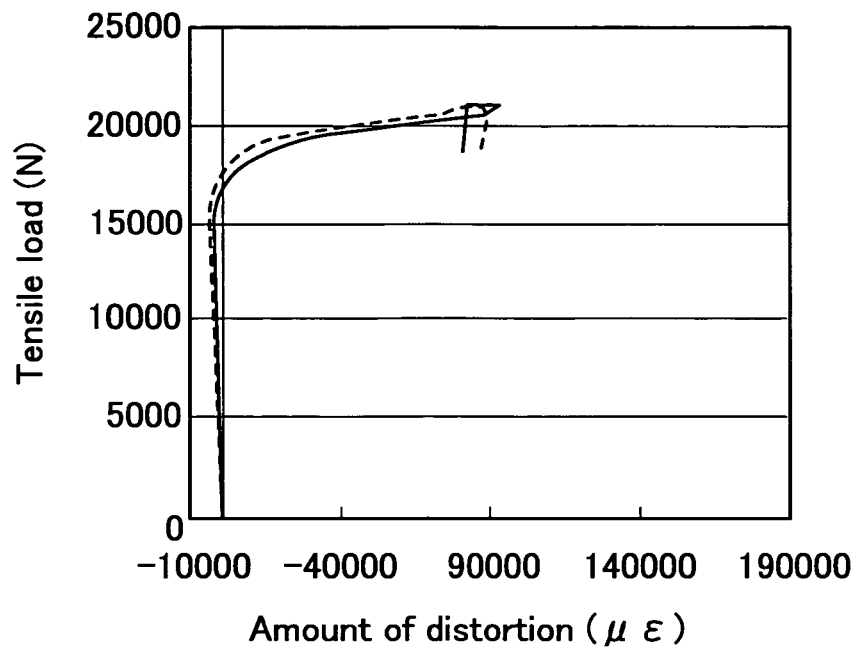
Figure 18B:
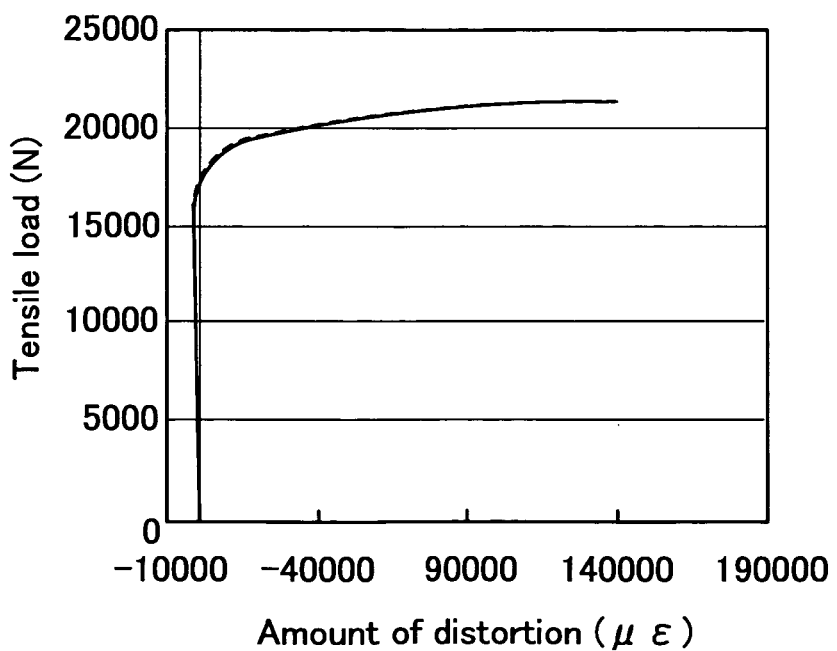

FIGS. 18A and 18B are graphs showing results of static tensile tests carried out with the tensile test machine shown in FIG. 14, respectively, wherein FIG. 18A shows a tensile load vs. distortion curve of conventional spot welding, and FIG. 18B shows a tensile load vs. distortion curve of spot welding of the present invention.

Figure 19A:
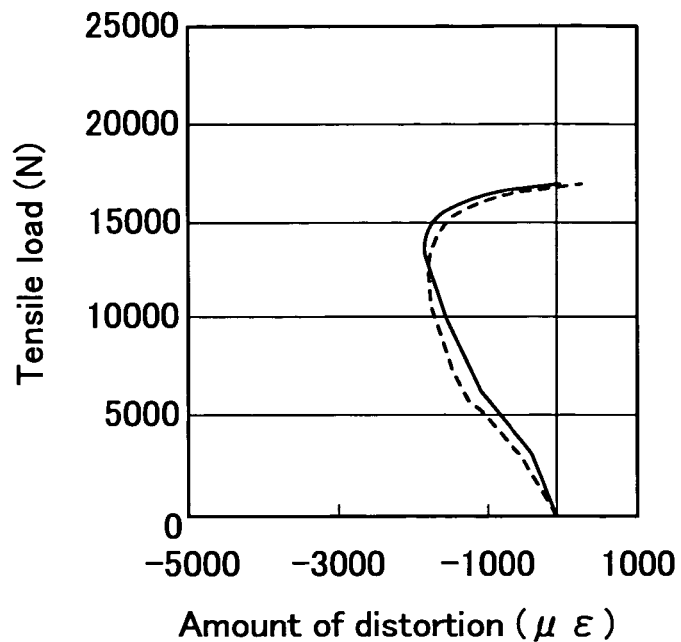
FIGS. 19A and 19B are graphs enlargedly showing the principal parts of the tensile load vs. distortion curves shown in FIGS. 18A and 18B, respectively.
Figure 19B:
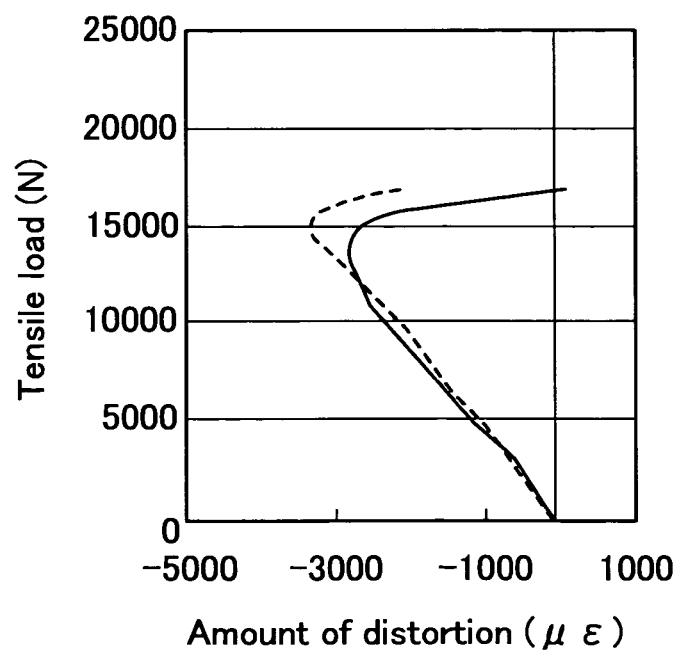
Figure 20A:
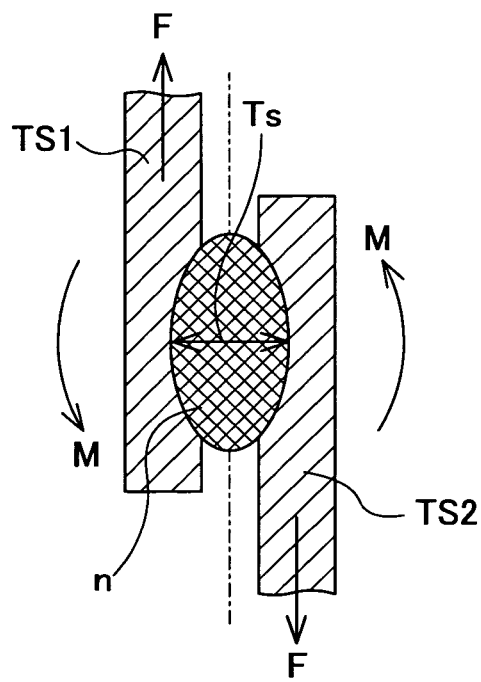
FIG. 20A is a sectional view of the pair of tensile-shear test pieces obtained by conventional spot welding.
Figure 20B:
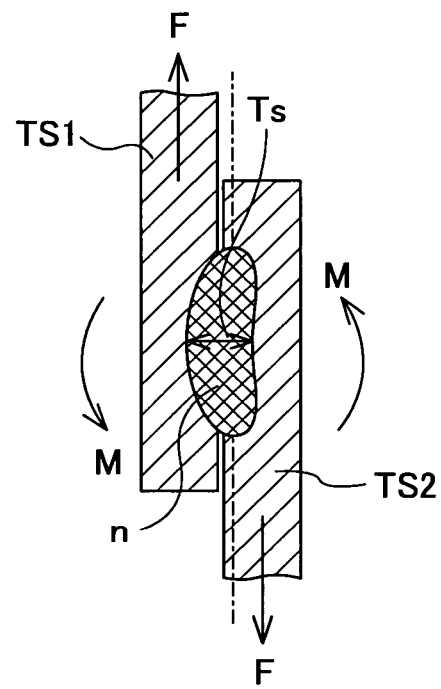
FIG. 20B is a sectional view of the pair of tensile-shear test pieces obtained by spot welding of the present invention.

FIGS. 19A and 19B are graphs enlargedly showing the principal parts of the tensile load vs. distortion curves shown in FIGS. 18A and 18B, respectively, where the scales of the vertical and horizontal axes are changed with respect to those in FIGS. 18A and 18B. FIG. 19A shows tensile load vs. distortion curve of conventional spot welding, and FIG. 19B shows tensile load vs. distortion curve of spot welding of the present invention. FIGS. 20A and 20B are views for making a comparison between the welding mechanism of conventional spot welding and that of spot welding of the present invention, wherein FIG. 20A is a sectional view of the pair of tensile-shear test pieces obtained by conventional spot welding, and FIG. 20B is a sectional view of the pair of tensile-shear test pieces obtained by spot welding of the present invention.

Figure 21:
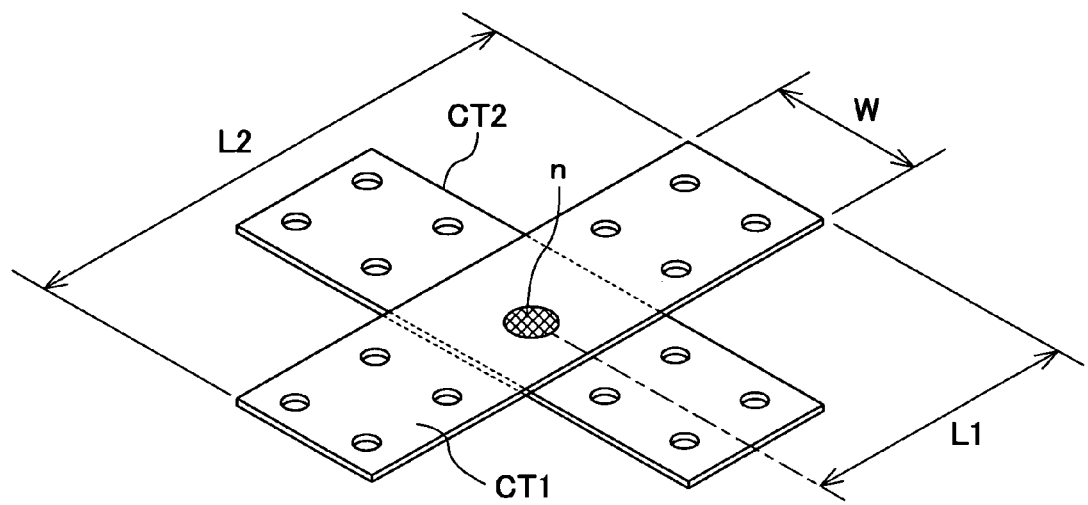
FIG. 21 is an external view showing a pair of tensile-peeling test pieces according to the present invention.
Figure 22:
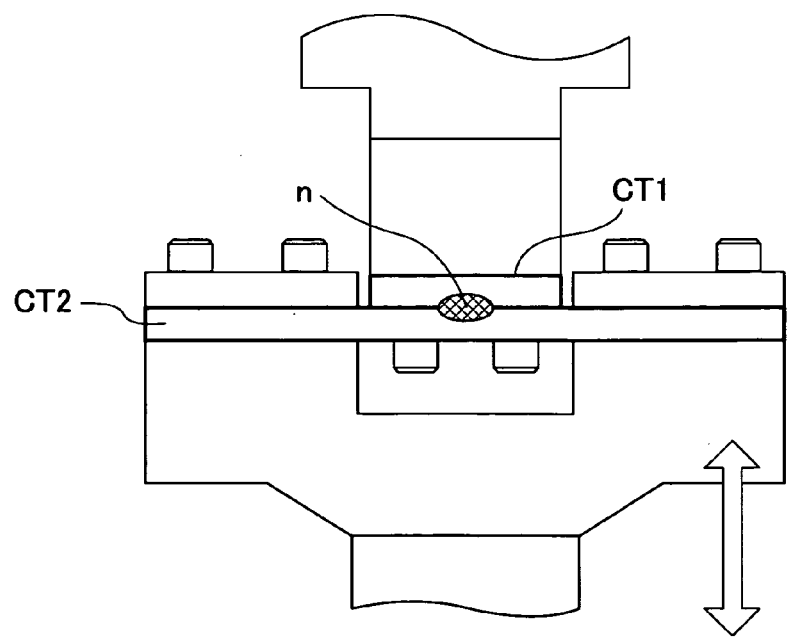
FIG. 22 is a front view of the tensile test machine for testing the pair of tensile-peeling test pieces.

FIG. 21 is an external view showing a pair of tensile-peeling test pieces used to obtain a difference between spot welding of the present invention and that of the conventional art. FIG. 22 is a front view of the tensile test machine for testing the pair of tensile-peeling test pieces shown in FIG. 21.

Figure 23A:
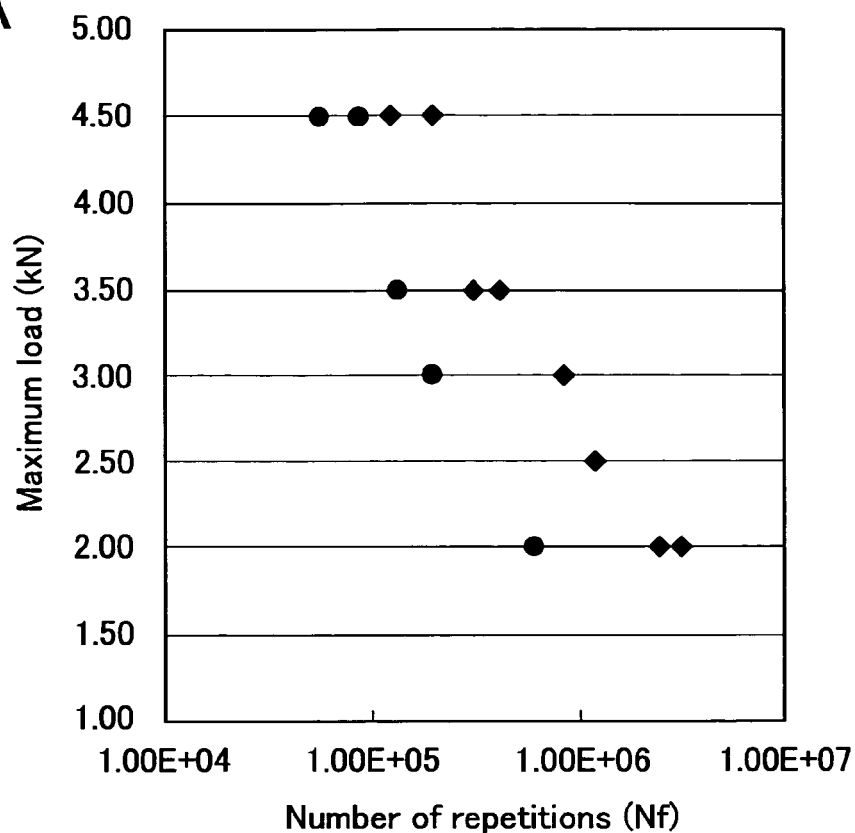
FIG. 23A is a graph showing plotted data on the shear-fatigue strength obtained by conventional spot welding and that obtained by spot welding of the present invention, using the pair of tensile-shear test pieces.
Figure 23B:
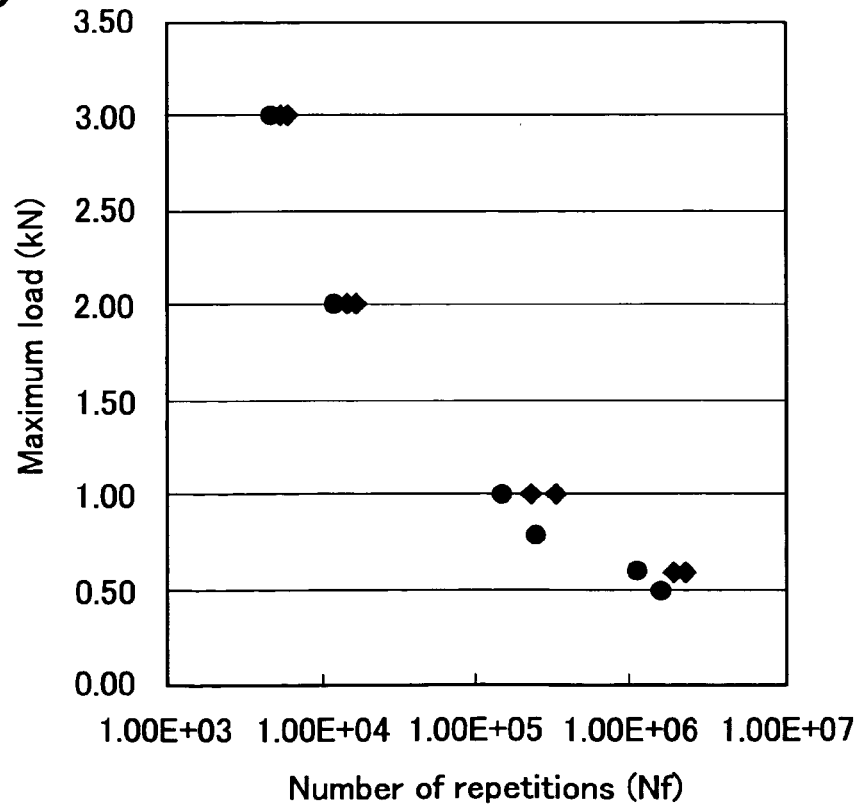
FIG. 23B is a graph showing plotted data on the shear-fatigue strength obtained by conventional spot welding and that obtained by sport welding of the present invention, using the pair of tensile-peeling test pieces.

FIGS. 23A and 23B are graphs showing plotted data on the shear-fatigue strength obtained by conventional spot welding and that obtained by the present invention, using the pair of tensile-shear test pieces shown in FIG. 13 and the pair of tensile-peeling test pieces shown in FIG. 21, wherein FIG. 23A is a graph showing shear-fatigue strength obtained using the pair of tensile-shear test pieces, and FIG. 23B is a graph showing shear-fatigue strength obtained using the pair of tensile-peeling test pieces.

Figure 24A:
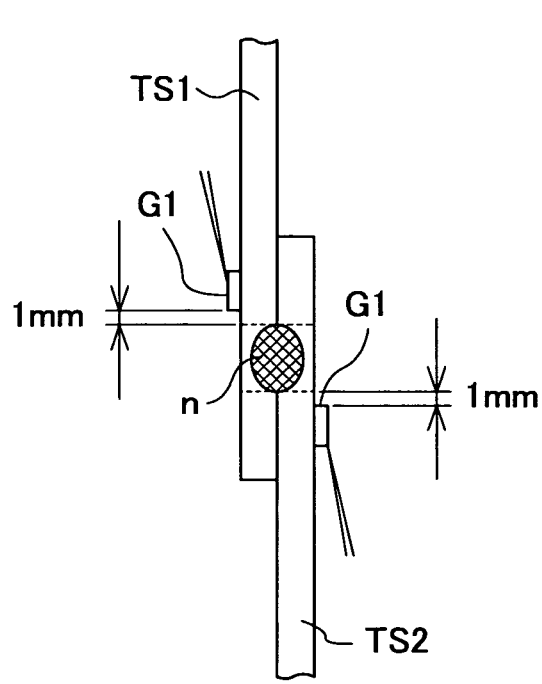
Figure 24B:
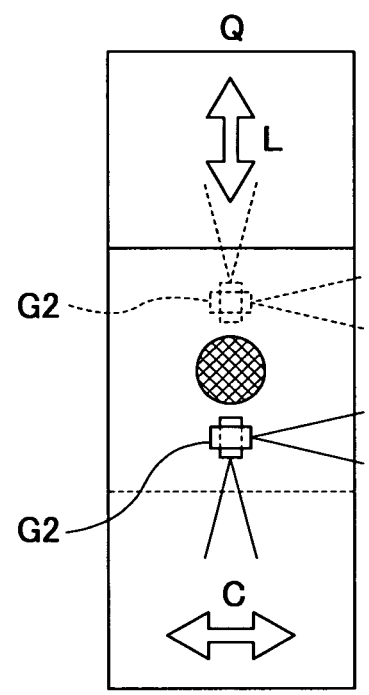
Figure 25:
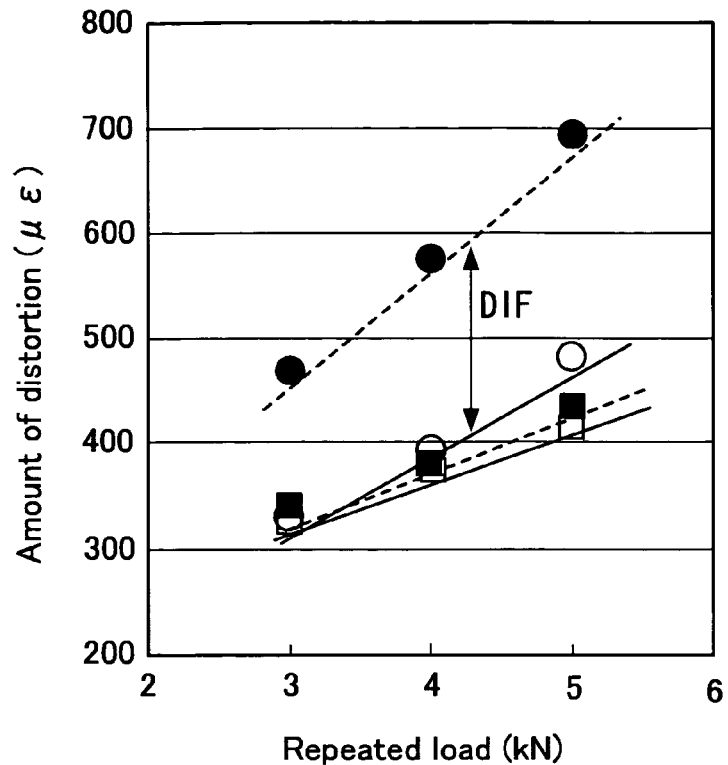
FIG. 25 is a graph showing plotted data on the distortion amount and repeated load in the tensile direction according to the testing method shown in FIG. 24.
Figure 26:
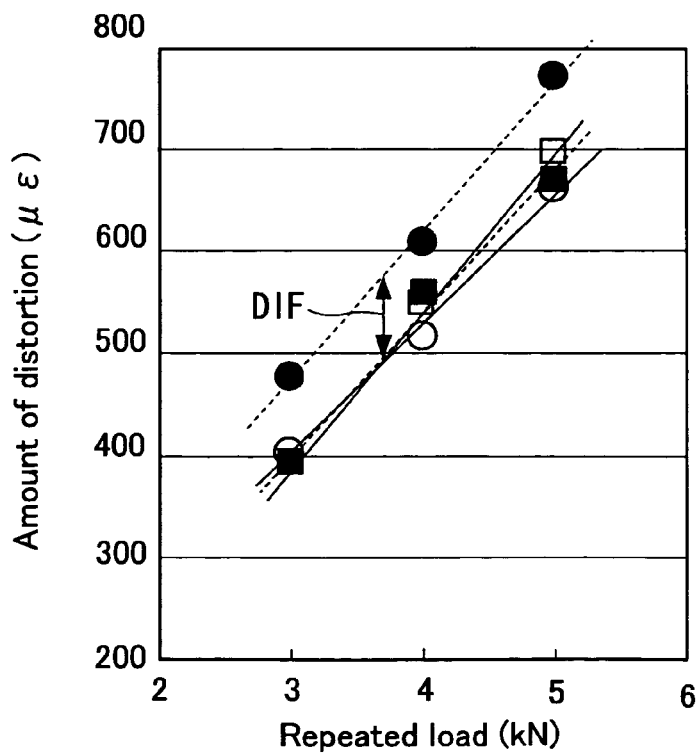
FIG. 26 is a graph showing plotted data on the distortion amount and repeated load in the direction orthogonal to the tensile direction according to the testing method shown in FIG. 24.

FIGS. 24A and 24B show positions and distorting directions of the distortion gauges placed on the pair of tensile-shear test pieces shown in FIG. 13 and for measuring the distortion amounts in the two orthogonal directions, respectively, wherein FIG. 24A is a front view, and FIG. 24B is a side view. FIG. 25 is a graph showing plotted data on the distortion amount and repeated load in the tensile direction according to the testing method shown in FIG. 24. FIG. 26 is a graph showing plotted data on the distortion amount and repeated load in the direction orthogonal to the tensile direction according to the testing method shown in FIG. 24.

FIGS. 27A to 27F are graphs showing measured distortion waveforms in the two orthogonal directions according to the testing method shown in FIG. 24, using a pair of tensile-shear test pieces obtained by conventional spot welding. FIG. 28A to 28F are graphs showing measured distortion waveforms in the two orthogonal directions according to the testing method shown in FIG. 24, using a pair of tensile-shear test pieces obtained by spot welding of the present invention.

First, the structure of a fuel-cell stack according to the present invention will be described. Referring to FIG. 1, a description may be omitted about the components having overlapping reference numerals in FIG. 29 associated with the conventional art, since their structure and operation are the same.

Referring to FIG. 1, a fuel-cell stack 10 includes a laminate 14 having a plurality of unit cells 12 laminated horizontally (direction of arrow A). A terminal plate 16a, an insulating plate 18, and an end plate 20a are arranged at one end of the laminate 14 in the laminating direction (direction of arrow A) in order toward the outside. A terminal plate 16b, an insulative spacer member 22, and an end plate 20b are arranged at the other end of the laminate 14 in the laminating direction in order toward the outside. The fuel-cell 100 is integrally held by a casing 24 formed rectangularly and including end plates 20a and 20b.

Referring to FIG. 1, the casing 11 includes a pair of end plates 20a and 20b arranged at both ends of the laminate 14 in the laminating direction. The casing 11 also includes a pair of side plates 1a and 1c and a pair of side plates 1b and 1d oppositely arranged around the laminate 14, the side plates 1a and 1c each being formed of a metal plate having a first thickness, the side plates 1b and 1d each being formed of a metal plate having first thickness. The casing 11 further includes a plurality of hinge plates 1aa, 1ab, 1ba, 1bc, 1ca, 1cc, 1da, and 1dc (hereafter, the reference numerals may be omitted in some cases) spot-welded to both ends of the side plates 1a to 1d and each formed of a metal plate having a second thickness greater than the first thickness. The casing 11 further includes linking pins 64a and 64b having different lengths and for linking the end plates 20a and 20b and the side plates 1a to 1d.

Referring to FIG. 1, the side plate 1a includes flange parts 10a and 11a having both ends bent orthogonally, and the side plate 1c includes flange parts 10c and 11c having both ends bent orthogonally. The side plates 1a and 1c are formed with a plurality of female threads. On the other hand, both ends of the side plates 1b and 1d are formed with a plurality of holes superimposed on the female threads. By engaging screws with the female threads, the side plates 1a to 1d are connected to each other (refer to FIG. 2). The casing 11 is formed in such a way.

The pair of end plates 20a and 20b are connected to the hinge plates through the linking pins 64a and 64b so as to close the openings at both ends of the side plates 1a to 1d formed like a rectangular tube (refer to FIG. 2). In such a way, the casing 11 is assembled with the laminate 14 being accommodated therein.

Referring to FIG. 1, terminal plates 16a and 16b are arranged at both ends of the laminate 14 in the laminating direction. The insulative spacer member 22 is interposed between one terminal plate 16a and one end plate 20b. Thus, even if the length of the laminate 14 in the laminating direction varies, variation in length of the laminate 14 in the laminating direction can surely be absorbed by merely adjusting the thickness of the insulative spacer member 22.

Referring to FIG. 1, although the pairs of side plates 1a to 1d are preferably reduced in thickness to reduce the weight of the casing 11, a thickness reduction causes insufficient strength to a bending moment. For example, the pairs of side plates 1a to 1d having smaller thickness may provide a plurality of convex ribs 1r (refer to FIG. 8A) by press working, by which insufficient strength to a bending moment can be complemented.

Referring to FIG. 1, one pair of side plates 1a and 1c having flange parts 10a, 11a, 10c, and 11c each include a thin metal plate and a bent piece. Preferably, in view of obtaining the strength to a torsion and a bending moment, the flange parts are provided to the pair of side plates. The plurality of hinge plates each have one end formed with a curled tab and the other end formed with a flat part. The flat parts are spot-welded to both ends of the side plates 1a to 1d in the length direction so that the tabs extend from both ends of the side plates in the length direction. The linking pins 64a and 64b are arranged through tabs of the side plates 1a to 1d and tabs of the end plates 20a and 20b, connecting the pair of end plates 20a and 20b and the plurality of hinge plates.

Referring to FIG. 1, when joining by spot welding the hinge plates 1aa, 1ab, 1ca, and 1cc to the pair of side plates 1a and 1c formed of a metal plate having first thickness, a pair of spot-welding electrodes e1 and e2 carry out welding by energization with the pair of side plates 1a and 1c and the hinge plates 1aa, 1ab, 1ca, and 1cc being in press contact, wherein the spot-welding electrode e1 that presses the hinge plates formed of a metal plate having second thickness greater than the first thickness has an end face formed with a concave 51 (refer to FIGS. 3A to 3C).

Referring to FIG. 1, when joining by spot welding the hinge plates 1ba, 1bc, 1da, and 1dc to the pair of side plates 1b and 1d formed of a metal plate having first thickness, the pair of spot-welding electrodes e1 and e2 carry out welding by energization with the pair of side plates 1b and 1d and the hinge plates 1ba, 1bc, 1da, and 1dc being in press contact, wherein the spot-welding electrode e1 that presses the hinge plates formed of a metal plate having second thickness greater than the first thickness has an end face formed with concave 51 (refer to FIGS. 3A to 3C).

Referring to FIG. 1, when joining by spot welding the hinge plates 1aa, 1ab, 1ca, and 1cc to the pair of side plates 1a and 1c formed of a metal plate having first thickness, the pair of spot-welding electrodes e1 and e2 carry out welding by energization with the pair of side plates 1a and 1c and the hinge plates 1aa, 1ab, 1ca, and 1cc being in press contact, wherein the spot-welding electrode e2 that presses the pair of side plates 1a and 1c having first thickness has an end face formed with a convex 52 (refer to FIGS. 3A to 3C). The same description applies to the pair of side plates 1b and 1d.

The fuel-cell stack shown in FIGS. 1 and 2 is a fuel-cell stack including pairs of opposed side plates each formed of a thin metal plate and hinge plates spot-welded to both ends of the side plates and each formed of a thick metal plate. Of the pair of spot-welding electrodes for carrying out welding by energization with the hinge plate and the side plate being in press contact, one spot-welding electrode that presses the hinge plate formed of a thick metal plate has an end face formed with a concave, thus allowing creation of a large-area contact face between the superposed metal plates when viewed from the electrode. Moreover, increased area of the melted portion allows enhancement in welding strength as well as reduction in junctions of spot welding. Such fuel-cell stack having reduced size and weight is suitably used, particularly, as a power source for electric vehicles.

Next, operation of spot welding according to the present invention will be described.

FIGS. 3A to 3C illustrate, as a pair of metal plates to be spot-welded, side plate 1b formed of a thin metal plate and hinge plate 1ba formed of a thick metal plate. However, the pair of metal plates are not limited thereto. The present invention produces an effect when a pair of metal plates are spot-welded wherein the thickness of one metal plate is smaller than that of the other metal plate. For example, the side plate 1b formed of a metal plate having first thickness and the hinge plate 1ba formed of a metal plate having second thickness may differ in thickness more than twice as much or have the same thickness (refer to FIGS. 4B1 to 4B3).

FIGS. 3A to 3C show a melting process of a pair of metal plates to be joined by the spot-welding electrode e1 having an end face formed with concave 51 (refer hereafter to as electrode e1 simply) and the spot-welding electrode e2 having an end face formed with convex 52 (refer hereafter to as electrode e2 simply).

In the pressing/energizing process shown in FIG. 3A, the pair of electrodes e1 and e2 bring the hinge plate 1ba and side plate 1b as superposed into press contact, so that the outer periphery of the crest of the concave 51 and the outer periphery of the convex 52 are pressed to each other and deformed plastically toward the concave 51, allowing creation of a large-area contact circle with excellent adherence surrounded by the outer periphery of the crests of the hinge plate 1ba and side plate 1b as superposed.

Next, in the melting process shown in FIG. 3B, a melted portion m can be expanded toward the concave 51 to enlarge the melt diameter from a substantial center of the contact circle. In the solidifying process shown in FIG. 3C, it was confirmed that the melted portion m was being solidified with minimum sheet separation occurring during typical welding solidification/shrinkage. Then, occurrence of expulsion is restrained.

In such a way, according to the present invention, of the pair of spot-welding electrodes for carrying out welding by energization with the thick hinge plate and the thin side plate being in press contact, one spot-welding electrode pressing the thick metal plate has an end face formed with a concave, allowing creation of a large-area contact face between the superposed metal plates when viewed from the electrode. According to the present invention, excessive concentration of current can be restrained by the large-area contact face, leading to restrained occurrence of expulsion. Moreover, increased area of the melted portion allows enhancement in welding strength as well as reduction in junctions of spot welding.

Using the pair of spot-welding electrodes e1 and e2 including electrode e1 having an end face formed with concave 51 and electrode e2 having an end face formed with convex 52 as shown in FIGS. 3A to 3C, test pieces obtained by spot-welding metal plates having the same thickness were subjected to fatigue tests. Consequently, a remarkable enhancement in shear-fatigue strength was obtained when compared with test pieces spot-welded using a pair of conventional spot-welding electrodes each having an end face formed with a convex (refer to FIGS. 4B1 to 4B3).

FIGS. 4A1 to 4A3 and FIGS. 4B1 to 4B3 make a comparison between the welding mechanism of conventional spot welding and that of spot welding of the present invention. Referring to FIGS. 4A1 to 4A3, using a pair of conventional spot-welding electrodes e3 and e4 each having an end face formed with a convex, the side plate 1b and the hinge plate 1ba having the same thickness are spot-welded. FIGS. 4B1 to 4B3 show simulation results when an applied load is 350 kg, an applied current is 8.5 KA, and an energization time is 2 cycles for each spot-welding electrode.

Making a comparison between FIGS. 4A1 and 4B1, FIG. 4A1 shows that a nugget grows from the melted portion m in the center, whereas FIG. 4B1 shows that a nugget grows from the melted portion m of a given diameter. Moreover, making a comparison between FIGS. 4A2 and 4B2, FIG. 4A2 shows that the side plate 1b and the hinge plate 1ba have the same current-density distribution, whereas FIG. 4B2 shows that the side plate 1b has greater current-density distribution. Furthermore, making a comparison between FIGS. 4A3 and 4B3, FIG. 4A3 shows that the side plate 1b and the hinge plate 1ba generate heat equally, whereas FIG. 4B3 shows that the side plate 1b generates heat principally.

Summarizing the above phenomena, with welding using the spot-welding electrodes according to the present invention, contact between the concave 51 of the electrode e1 and the side plate 1b is carried out in the outer-peripheral direction in the initial stage of energization, the side plate 1b has greater current density than that of the hinge plate 1ba. Consequently, the side plate 1b (electrode e2) generates heat preferentially to produce a nugget.

As seen in the test results that will be discussed later, the test pieces spot-welded using a pair of spot-welding electrodes having end faces formed with a concave and a convex provide reduced clearance between base materials (sheet separation) when compared with the test pieces obtained by conventional spot welding. It is supposed that the metal plate positioned at the concave-side spot-welding electrode is deformed concavely to thereby restrain sheet separation due to enlargement of a nugget.

Referring to FIGS. 20A and 20B, sheet separation Ts between a pair of tensile-shear test pieces TS1 and TS2 obtained by conventional spot welding as shown in FIG. 20A is greater than sheet separation Ts between the pair of tensile-shear test pieces TS1 and TS2 obtained by spot welding of the present invention as shown in FIG. 20B. Making a comparison between FIGS. 20A and 20B, it is assumed that a bending moment M acting on a melted nugget n is proportional to sheet separation Ts if the same tensile force F is applied. It is supposed that the difference in bending moment is emerged as difference in shear strength.

In such a way, the fuel-cell stack according to the present invention is a fuel-cell stack including pairs of opposed side plates each formed of a metal plate having first thickness and a plurality of hinge plates spot-welded to both ends of the side plates and each formed of a metal plate having second thickness greater than the first thickness, wherein, of a pair of spot-welding electrodes for carrying out welding by energization with the hinge plate and the side plate being in press contacts one spot-welding electrode that presses the hinge plate formed of a metal plate having second thickness has an end face formed with a concave, thus reducing sheet separation between the hinge plate and the side plate, allowing enhancement in strength to shear fatigue due to repeated load.

Next, the test results of spot welding according to the present invention will be described.

FIGS. 5A and 5B make a comparison between the melt diameter obtained by conventional spot welding and that obtained by spot welding of the present invention shown in FIGS. 3A to 3C. FIG. 5A is a sectional view of a pair of metal plates having different thicknesses and welded by conventional spot welding, and FIG. 5B is a sectional view of a pair of metal plates having different thicknesses and welded by spot welding of the present invention. It is noted that FIGS. 5A and 5B provide a scale to allow a comparison between the melt diameters.

Referring to FIGS. 5A and 5B, the material of a pair of metal plates was SUS304 as in the actual device, and the respective thicknesses were 0.6 mm and 1.8 mm. According to the test results, a melt diameter A obtained by conventional spot welding was 4.4 mm, whereas a melt diameter B obtained by spot welding of the present invention was 5.89 mm, providing excellent results of about 34% increase in melt diameter. Moreover, the maximum tensile-shear strength was increased from 5.65 kN to 6.23 kN, providing excellent results.

When obtaining the test results shown in FIGS. 5A and 5B, conventional spot welding was tested by selecting one having minimum occurrence of expulsion from a combination of a pair of electrodes each having an end face formed with a convex or a pair of electrodes each having an end face formed with a flat and under the conditions of forming a maximum nugget diameter (melt diameter). The welding conditions of the two were such that an applied load is 250 kg, and an energization time is 0.16 sec. Moreover, an applied current is 8300 A for conventional spot welding and 8560A for spot welding of the present invention.

Next, proving a repeated load of tensile shear to the pair of metal plates shown in FIGS. 5A and 5B, the fatigue tests were carried out to obtain the number of repetitions up to fracture of the welded parts, the results of which are shown in FIG. 6. In a graph of FIG. 6, the numbers of repetitions up to fatigue failure of the welded parts of the conventional art and the present invention were plotted by changing a repeated load. Referring to FIG. 6, circles designate plotted points according to conventional welding, whereas triangles designate plotted points according to welding of the present invention.

According to the test results in FIG. 6, when the number of repetitions is in the vicinity of 10000, a repeated load of conventional welding was about 2600 N, whereas a repeated load of welding of the present invention was about 3600 N. Moreover, when the number of repetitions is 35000, a repeated load of conventional welding was about 2200 N, whereas a repeated load of welding of the present invention was about 2900 N. In such a way, a repeated load up to fracture of the present invention was 1.3 to 1.4 times larger than that of the conventional art, providing excellent results.

In such a way, due to enhancement in joining strength of one point, it is expected that spot welding of the present invention contributes to a reduction in number of points of spot welding in the actual device. A reduction in number of points of spot welding allows a reduction in manufacturing cost of the fuel-cell stack. With the fuel-cell stack in which a laminate including a plurality of unit cells laminated is accommodated in a box-like casing, for example, the number of points of spot welding in a pair of metal plates is calculated by dividing the tensile-shear strength of the pair of metal plates by that for each point of spot welding. Moreover, allowing for a safety factor, the number of points of spot welding in the pair of metal plates is determined finally.

FIG. 7 is a graph for determining the safety factor of a fatigue limit from an alternating repeated load Lalt of one-point spot welding at the specific number of fatigue repetitions and a mean load Lmean of one-point spot welding. Referring to FIG. 7, the range surrounded by a straight line connecting the alternating load Lalt=3750 N and the mean load Lmean=3750 N and a straight line connecting the alternating load Lalt=1750 N and the mean load Lmean=6250 N is a safety area.

Referring to FIG. 7, when joining the hinge plate 1ba formed of a thick metal plate and the side plate 1b formed of a thin metal plate (refer to FIG. 1), conventional spot welding needed 26 points to enter the safety area. It could be confirmed that 21 points may be sufficient to enter the safety area according to spot welding of the present invention. Referring to FIG. 6, the number of points of conventional spot welding is shown by a cross (x), whereas the number of points of spot welding of the present invention is shown by an asterisk (*).

Moreover, using the actual component (side plate 1b, for example)(refer to FIG. 1), the repetition-fatigue tests were carried out by providing thereto a repeated load corresponding to an actual load so as to check the effect. FIGS. 8A and 8B show a method of such repetition-fatigue tests. Referring to FIGS. 8A and 8B, 18 distortion gauges G were placed on the thin side plate 1b in the vicinity of 18 welds S to be in a one-to-one correspondence. A tensile-shear load of 15 kN to 20kN was repeatedly provided 20000 times to both ends of the side plate 1b to measure its amount of distortion.

FIG. 9 is a bar graph showing results of measurement obtained under the above measuring conditions, where the vertical axis shows an amount of distortion (με), and the horizontal axis shows points of measurement. A left bar at each point of measurement shows an amount of distortion when a tensile-shear load is repeatedly provided 20000 times, whereas a right bar at each point of measurement shows an amount of distortion when a tensile-shear load is provided initially.

It was seen from the results of measurement of FIG. 9 that none of 21 points of spot welding undergoes a proof stress for producing 0.2% or more permanent distortion, obtaining the results that the casing of the present invention can withstand a repeated load in practical use.

Next, a comparison was made between the state of occurrence of expulsion caused by conventional spot welding and the state of occurrence of expulsion caused by spot welding of the present invention. FIG. 10A is an external view of a junction obtained by conventional spot welding, and FIG. 10B is an external view of a junction obtained by spot welding of the present invention. In both drawings, the thin metal plate is removed. Occurrence of expulsion was confirmed for conventional spot welding shown in FIG. 10A, whereas no occurrence of expulsion was confirmed for spot welding of the present invention shown in FIG. 10B.

Typically, when spot welding is carried out under the suitable welding conditions, a junction between the base materials held by the electrodes causes resistance heat generation by energization and melts to form a nugget. However, if the balance during formation of a nugget is thrown off, melted metal to form a nugget will dissipate from a junction, producing expulsion. Since it was confirmed that spot welding of the present invention provides sufficient joining strength, and has no occurrence of expulsion, it is assumed that the welding conditions are suitable and, particularly, an improvement in shape of an end face of the electrode contributes to enhancement in quality of junctions of spot welding.

During the above tests, using a pair of metal plates having different thicknesses as in the actual device, it was examined if spot welding of the present invention contributes to the joining strength of the metal plates. It was proved by the above tests that the tensile strength enhances with enlargement of the melt diameter. Moreover, using a pair of metal plates having the same thickness, it was examined if spot welding of the present invention contributes to the fatigue strength of the metal plates. It is noted that, in the following tests, the diameter of a melted nugget obtained by the present invention and the diameter of a melted nugget obtained by the conventional art are approximate to each other.

Referring to FIGS. 11A1 to 11B3, the difference in sheet separation is examined between spot welding of the conventional art and that of the present invention, wherein an applied load and an applied current are changed. FIGS. 11A1 to 11A3 show sections of a pair of test pieces, which are joined by the pair of spot-welding electrodes e3 and e4 (refer hereafter to as electrodes e3 and e4 simply) according to the conventional art. With the shape of ends of the electrodes e3 and e4, the diameter of contact to the test piece is 6 mm as shown in FIG. 17A. FIGS. 11B1 to 11B3 show sections of a pair of test pieces, which are joined by the pair of spot-welding electrodes e1 and e2 (refer hereafter to as electrodes e1 and e2 simply) according to the present invention. With the shape of ends of the electrodes e1 and e2, the diameter of contact to the test piece is 6 mm as shown in FIG. 17B. Referring to FIGS. 17A and 17B, outer diameters Db and Da of the electrodes e2 and e4 are slightly smaller than the outer diameters of the opposed electrodes e1 and e3.

FIGS. 11A1 and 11B1 compare sheet separations Ts when an applied load is 250 kg, and an applied current is 7.0 kA. FIGS. 11A2 and 11B2 compare sheet separations Ts when an applied load is 350 kg, and an applied current is 8.5 kA. FIGS. 11A3 and 11B3 compare sheet separations Ts when an applied load is 450 kg, and an applied current is 10.0 kA.

FIG. 12 shows results of measurement of sheet separations Ts after 14 cycles of energization time under the above welding conditions. Referring to FIG. 12, of each pair of bars, the left bar shows a result obtained using the pair of electrodes e1 and e2 according to the present invention, whereas the right bar shows a result obtained using the pair of electrodes e3 and e4 according to the conventional art.

It is seen from FIG. 12 that both of the sheet separations Ts increase with increasing an applied load and an applied current. It is also seen that the sheet separation Ts obtained using the electrodes e1 and e2 is below the half the sheet separation Ts obtained using the electrodes e3 and e4 irrespective of the welding conditions. As described above, it is supposed that the metal plate positioned at the concave-side spot-welding electrode is deformed concavely to thereby restrain sheet separation due to enlargement of a nugget.

Next, the results of the static tensile tests for spot-welded parts will be described. As test pieces, a pair of tensile-shear test pieces TS1 and TS2 were used, which are often adopted for evaluation of strength of spot-welded parts (refer to FIG. 13). The material of the tensile-shear test pieces TS1 and TS2 was high tensile-strength steel plate of 590 N, and the thickness was 1.6 mm. A length L2 and width W of the tensile-shear test pieces TS1 and TS2 were 125 mm and 40 mm, and a distance L1 from the center of the melted nugget n to an edge of the tensile-shear test pieces TS1 and TS2 was 105 mm (refer to FIG. 13).

The static tensile tests were carried out with a typical tensile test machine shown in FIG. 14. Lengths L3 and L4 of the tensile-shear test pieces TS1 and TS2 from the center of the melted nugget n to a chucking end were 50 mm.

Referring to FIG. 15A, a diameter A of the melted nugget n produced in the pair of tensile-shear test pieces TS1 and TS2 is 6.24 mm, and a sheet separation Ta is 0.123 mm. Referring to FIG. 15B, the diameter A of the melted nugget n produced in the pair of tensile-shear test pieces TS1 and TS2 is 6.51 mm, and the sheet separation Ta is 0.075 mm. In order to make a comparison between the shear strength of conventional spot welding and that of spot welding of the present invention, the static tensile tests for spot-welded parts were carried out with the diameters of melted nuggets being approximate to each other.

Referring to FIGS. 16A and 16B, the distortion gauges G were placed on the surfaces of the pair of tensile-shear test pieces TS1 and TS2. Each distortion gauge G was mounted at the position about 1 mm away from an edge of the melted nugget n. The pair of tensile-shear test pieces TS1 and TS2 undergo a tensile force in the direction of arrow in FIG. 16B. Each distortion gauge G serves to measure an amount of distortion in the tensile direction. The melted nuggets n shown in FIGS. 15A and 15B are produced by the pair of electrode e1 and e2 and the pair of electrodes e3 and e4 shown in FIGS. 17A and 17B.

The results of the static tensile tests carried out under the test conditions and according to the testing method shown in FIGS. 13 to 17B are illustrated in FIGS. 18A to 19B. Referring to FIGS. 18A to 19B, a tensile load vs. distortion curve indicated by dotted line shows a deformation of the tensile-shear test piece TS1, and a tensile load vs. distortion curve indicated by solid line shows a deformation of the tensile-shear test piece TS2 (refer to FIGS. 16A and 16B).

Making a comparison between FIGS. 18A and 18B, it is seen that greater amount of residual elongation at yield up to fracture (shearing) is obtained by spot welding of the present invention shown in FIG. 18B. Spot welding of the present invention has greater plastic region and thus can withstand a plastic deformation.

Making a comparison between FIGS. 19A and 19B, it is seen that greater amount of distortion in the elastic region is obtained by conventional spot welding shown in FIG. 19A. It is assumed that the difference in amount of distortion in the elastic region shown in FIGS. 19A and 19B is due to difference in sheet separation.

FIG. 20A is a sectional view of the pair of tensile-shear test pieces obtained by conventional spot welding, and FIG. 20B is a sectional view of the pair of tensile-shear test pieces obtained by spot welding of the present invention. Since the sheet separation Ts is interposed between the pair of tensile-shear test pieces TS1 and TS2, a shear force F acting on a junction between the melted nugget n and each of the tensile-shear test pieces TS1 and TS2 is changed into bending moment M with the melted nugget n as stationary support end. It is supposed that the magnitude of the bending moment M is proportional to the size of the sheet separation Ts. The bending moment M acts on the surface of each of the tensile-shear test pieces TS1 and TS2 (surface on which the distortion gauge G is placed) as a compressive stress in the elastic region. It is supposed that the difference in compressive stress results in difference in amount of distortion on the surface of each of the tensile-shear test pieces TS1 and TS2. Spot welding of the present invention, which reduces sheet separation based on such a mechanism, can reduce in the static tensile tests an amount of distortion in the elastic region, enhancing the fatigue strength up to shearing.

Next, the results of the shear-fatigue tests for spot-welded parts will be described. As test pieces, the pair of tensile-shear test pieces TS1 and TS2 shown in FIG. 13 and a pair of tensile-peeling test pieces CT1 and CT2 shown in FIG. 21 were used. The material of the tensile-shear test pieces TS1 and TS2 was high tensile-strength steel plate of 590 N, and the thickness was 1.6 mm. The length L2 and width W of the tensile-shear test pieces TS1 and TS2 used in the shear-fatigue tests were 150 mm and 40 mm, and the distance L1 from the center of the melted nugget n to an edge of the tensile-shear test pieces TS1 and TS2 was 130 mm (refer to FIG. 13).

The shear-fatigue tests using the tensile-shear test pieces TS1 and TS2 were carried out with the typical tensile test machine as shown in FIG. 14. The lengths L3 and L4 of the tensile-shear test pieces TS1 and TS2 from the center of the melted nugget n to a chucking end were 70 mm. Using the tensile test machine shown in FIG. 14, different repeated loads were provided to the pair of tensile-shear test pieces TS1 and TS2. The cycle of repetition of the tensile test machine was 20 Hz.

During the shear-fatigue tests, conventional spot welding was examined using as samples the pair of tensile-shear test pieces TS1 and TS2 having melted nugget n of the diameter A=6.24 mm and sheet separation Ta=0.123 (refer to FIG. 15A), whereas spot welding of the present invention was examined using as samples the pair of tensile-shear test pieces TS1 and TS2 having melted nugget n of the diameter A=6.51 mm and sheet separation Tb=0.075 mm (refer to FIG. 15B). The shape of ends of the electrodes according to conventional spot welding and according to spot welding of the present invention was the same as in the static tensile tests (refer to FIGS. 17A and 17B).

Different repeated loads were provided to the pair of tensile-shear test pieces TS1 and TS2 to obtain the numbers of repetitions up to fracture, making a comparison between the shear-fatigue strength of conventional spot welding and that of spot welding of the present invention, the results of which are shown in Table 1.

TABLE 1

| Welding electrode | Maximum load (kN) | Minimum load (kN) | Number of repetitions (Nf) |
|---|---|---|---|
| Conventional electrode | 4.50 | 0.45 | 5.59E+04 |
| | 3.50 | 0.35 | 1.33E+05 |
| | 3.00 | 0.30 | 1.95E+05 |
| | 2.00 | 0.20 | 6.13E+05 |
| | 4.50 | 0.45 | 8.89E+04 |
| Electrode of invention | 4.50 | 0.45 | 1.99E+05 |
| | 4.50 | 0.45 | 1.25E+05 |
| | 3.50 | 0.35 | 3.12E+05 |
| | 3.00 | 0.30 | 8.40E+05 |
| | 2.50 | 0.25 | 1.19E+06 |
| | 2.00 | 0.20 | 2.44E+06 |
| | 2.00 | 0.20 | 3.21E+06 |
| | 3.50 | 0.35 | 4.15E+05 |

Referring to FIG. 21, the material of the pair of tensile-peeling test pieces CT1 and CT2 was high tensile-strength steel plate of 590 N, and the thickness was 1.6 mm. The length L2 and width W of the tensile-peeling test pieces CT1 and CT2 were 150 mm and 50 mm, and the distance L1 from the center of the melted nugget n to an edge of the tensile-peeling test pieces CT1 and CT2 that intersects in the shape of a cross was 75 mm. Ends of the pair of tensile-peeling test pieces CT1 and CT2 are formed with screw holes for mounting to a fatigue test machine shown in FIG. 22.

The shear-fatigue tests using the pair of tensile-peeling test pieces CT1 and CT2 were carried out with the fatigue test machine shown in FIG. 22. Using the fatigue test machine shown in FIG. 22, different repeated loads were provided to the pair of tensile-peeling test pieces CT1 and CT2. The cycle of repetition of the fatigue test machine was 10 Hz.

The diameter and sheet separation of the melted nugget n produced in the tensile-peeling test pieces CT1 and CT2 were the same as those in the pair of tensile-shear test pieces TS1 and TS2 (refer to FIGS. 15A and 15B). The shape of ends of the pairs of opposed spot-welding electrodes to be compared with each other is the same as the shape that has already been described (refer to FIGS. 17A and 17B).

Different repeated loads were provided to the pair of tensile-peeling test pieces CT1 and CT2 to obtain the numbers of repetitions up to fracture, making a comparison between the peeling-fatigue strength of conventional spot welding and that of spot welding of the present invention, the results of which are shown in Table 2.

TABLE 2

| Welding electrode | Maximum load (kN) | Minimum load (kN) | Number of repetitions (Nf) |
|---|---|---|---|
| Conventional electrode | 3.00 | 0.30 | 4.70E+03 |
| | 2.00 | 0.20 | 1.23E+04 |
| | 1.00 | 0.10 | 1.53E+05 |
| | 0.80 | 0.08 | 2.62E+05 |
| | 0.60 | 0.06 | 1.15E+06 |
| | 0.50 | 0.05 | 1.63E+06 |
| Electrode of invention | 3.00 | 0.30 | 5.80E+03 |
| | 3.00 | 0.30 | 5.40E+03 |
| | 2.00 | 0.20 | 1.50E+04 |
| | 2.00 | 0.20 | 1.64E+04 |
| | 1.00 | 0.10 | 3.50E+05 |
| | 1.00 | 0.10 | 2.41E+05 |
| | 0.60 | 0.06 | 2.28E+06 |
| | 0.60 | 0.06 | 1.96E+06 |

Referring to FIGS. 23A and 23B, a load vs. number (LN) diagram is obtained by plotting data shown in Tables 1 and 2. The LN diagram is a graph showing the number of repetitions up to fatigue failure, in which a maximum load of the repeated loads is taken on the vertical axis, and the number of stress repetitions is taken on the horizontal axis in a log scale. FIG. 23A is a graph for the hear-fatigue strength shown in Table 1, and FIG. 23B is a graph for the peeling-fatigue strength shown in Table 2. Referring to FIGS. 23A and 23B, circles designate data on conventional spot welding, and rhombuses designate data on spot welding of the present invention.

In view of data shown in Tables 1 and 2 and the LN diagrams shown in FIGS. 23A and 23B, spot welding of the present invention provided a shear-fatigue strength about 5 times greater than that of conventional spot welding. However, there was no difference in peeling-fatigue strength between spot welding of the present invention and conventional spot welding.

Next, the results of measurement of the amount of distortion of spot-welded parts obtained by the shear-fatigue tests will be described. As test pieces, the pair of tensile-shear test pieces TS1 and TS2 shown in FIG. 13 were used. The material of the tensile-shear test pieces TS1 and TS2 was high tensile-strength steel plate of 590 N, and the thickness was 1.6 mm. The length L2 and width W of the tensile-shear test pieces TS1 and TS2 used in the shear-tensile tests were 150 mm and 40 mm, and the distance L1 from the center of the melted nugget n to an edge of the tensile-shear test pieces TS1 and TS2 was 130 mm (refer to FIG. 13).

The shear-fatigue tests using the tensile-shear test pieces TS1 and TS2 were carried out with the typical tensile test machine as shown in FIG. 14. The lengths L3 and L4 of the tensile-shear test pieces TS1 and TS2 from the center of the melted nugget n to a chucking end were 70 mm. Using the tensile test machine shown in FIG. 14, different repeated loads were provided to the pair of tensile-shear test pieces TS1 and TS2. The cycle of repetition of the tensile test machine was 10 Hz.

During the shear-fatigue tests, conventional spot welding was examined using as samples the pair of tensile-shear test pieces TS1 and TS2 having melted nugget n of the diameter A=6.24 mm and sheet separation Ta=0.123 mm (refer to FIG. 15A), whereas spot welding of the present invention was examined using as samples the pair of tensile-shear test pieces TS1 and TS2 having melted nugget n of the diameter A=6.51 mm and sheet separation Tb=0.075 mm (refer to FIG. 15B). The shape of ends of the pairs of opposed spot-welding electrodes to be compared with each other is the same as the shape that has already been described (refer to FIGS. 17A and 17B).

Referring to FIGS. 24A and 24B, a pair of first distortion gauges G1 were placed on the surfaces of the pair of tensile-shear test pieces TS1 and TS2. Each first distortion gauges G1 was mounted at the position about 1 mm away from an edge of the melted nugget n. The pair of tensile-shear test pieces TS1 and TS2 undergo a tensile repeated load Q in the direction of arrow in FIG. 24B. Each first distortion gauge G1 serves to measure an amount of distortion in a direction L parallel to the acting direction of the tensile repeated load Q. Moreover, a pair of second distortion gauges G2 were placed on the surfaces to intersect with the first distortion gauges G1 in the shape of a cross. Each second distortion gauge G2 serves to measure an amount of distortion in a direction C orthogonal to the acting direction of the tensile repeated load Q.

Different repeated loads were provided to the pair of tensile-shear test pieces TS1 and TS2 to measure the amounts of distortion in the directions L and C during application of the repeated loads, making a comparison between the amounts of distortion due to repeated loads obtained by conventional spot welding and spot welding of the present invention, the results of which are shown in Table 3. It is noted that the amount of distortion at repeated load shown in Table 3 is an absolute value of the difference between a distortion value at maximum load and a distortion value at minimum load, and provides a mean value of the absolute value at alternating repeated load.

TABLE 3

| Repeated load (kN) | Amount of distortion at repeated load (µε) | | | | | | | |
|---|---|---|---|---|---|---|---|---|
| | Conventional electrode | | | | Electrode of invention | | | |
| | TS1 | | TS2 | | TS1 | | TS2 | |
| | Direc. L | Direc. C | Direc. L | Direc. C | Direc. L | Direc. C | Direc. L | Direc. C |
| 0.3–3.0 | 333 | 404 | 471 | 478 | 328 | 394 | 341 | 395 |
| 0.4–4.0 | 396 | 518 | 577 | 610 | 377 | 549 | 381 | 560 |
| 0.5–5.0 | 485 | 664 | 695 | 774 | 419 | 697 | 439 | 672 |

FIG. 25 is a graph showing plotted amount of distortion in the direction L (refer to FIG. 24B) parallel to the acting direction of the tensile repeated load Q based on data obtained in Table 3, where the vertical axis shows an amount of distortion (µε), and the horizontal axis shows a maximum load (kN) of the repeated loads. FIG. 26 is a graph showing plotted amount of distortion in the direction C (refer to FIG. 24B) orthogonal to the acting direction of the tensile repeated load Q based on data obtained in Table 3, where the vertical axis shows an amount of distortion (µε), and the horizontal axis shows a maximum load (kN) of the repeated loads.

Referring to FIGS. 25 and 26, filled circles designate an amount of distortion of the tensile-shear sample piece TS2 obtained by conventional spot welding, and void circles designate an amount of distortion of the tensile-shear sample piece TS1 obtained by conventional spot welding. Moreover, filled rectangles designate an amount of distortion of the tensile-shear sample piece TS2 obtained by spot welding of the present invention, and void rectangles designate an amount of distortion of the tensile-shear sample piece TS1 obtained by spot welding of the present invention.

As shown in FIGS. 25 and 26, conventional spot welding is greater than spot welding of the present invention in the amount of distortion as well as difference DIF in amount of distortion between the tensile-shear test pieces TS1 and TS2.

Figure 27A:
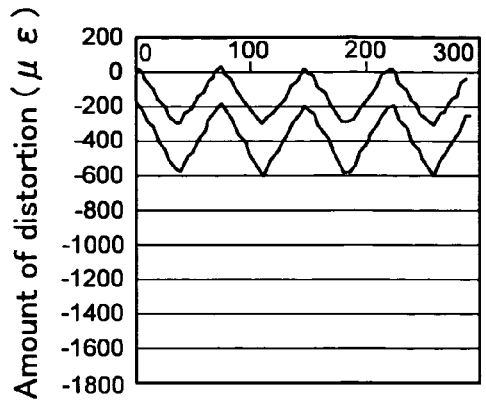
FIGS. 27A to 27F are graphs showing measured distortion waveforms in the two orthogonal directions according to the testing method shown in FIG. 24, using a pair of tensile-shear test pieces obtained by conventional spot welding.
Figure 27B:
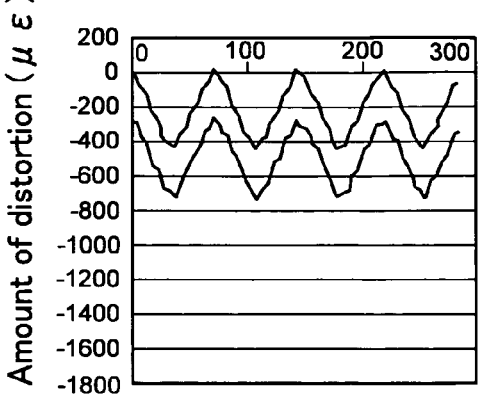
Figure 27C:
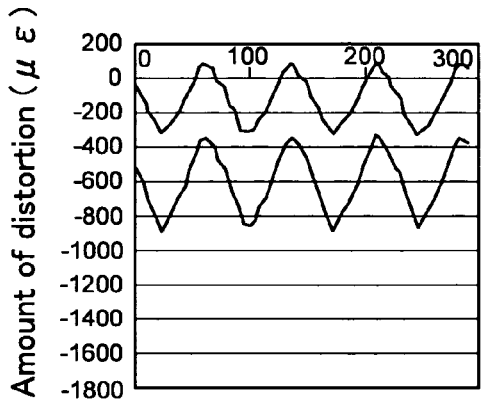
Figure 27D:
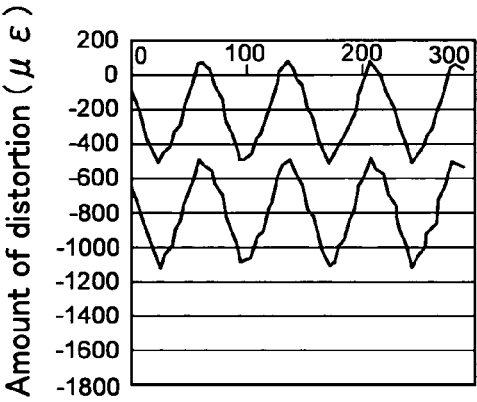
Figure 27E:
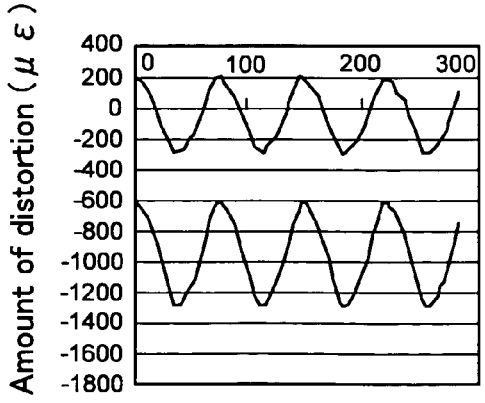
Figure 27F:
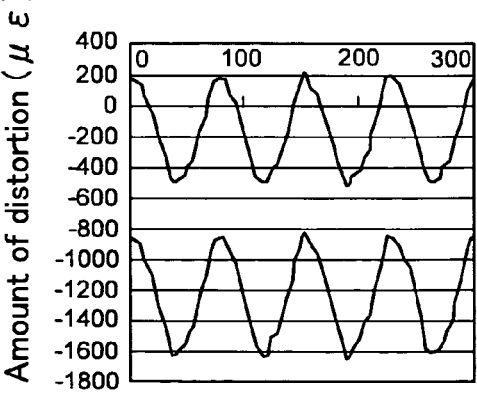

FIGS. 27A to 27F show alternating distortion waveforms generated in the pair of tensile-shear test pieces TS1 and TS2 (refer to FIG. 13) obtained by conventional spot welding. FIGS. 27A, 27C, and 27E show distortion waveforms of tensile-shear test piece TS1, and FIGS. 27B, 27D, and 27F show distortion waveforms of the tensile-shear test piece TS2. FIGS. 27A and 27B show distortion waveforms when a repeated load is 0.3 kN to 3.0 kN, FIGS. 27C and 27D show distortion waveforms when a repeated load is 0.4 kN to 4.0 kN, and FIG. 27E and 27F show distortion waveforms when a repeated load is 0.5 kN to 5.0 kN (refer to Table 3). In each of FIGS. 27A to 27F, an upper distortion waveform is a waveform measured with the distortion gauges G1 for measuring an amount of distortion in the direction L, and a lower distortion waveform is a waveform measured with the second distortion gauges G2 for measuring an amount of distortion in the direction C (refer to FIGS. 24A and 24B).

Figure 28A:
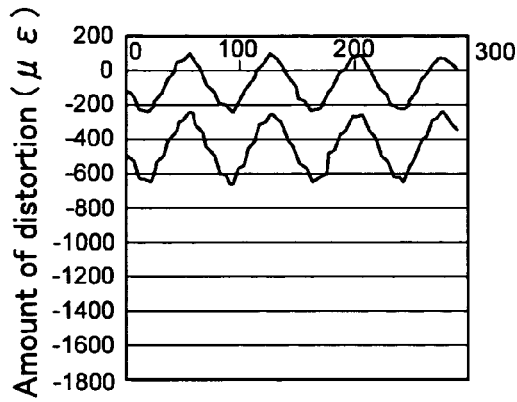
FIGS. 28A to 28F are graphs showing measured distortion waveforms in the two orthogonal directions according to the testing method shown in FIG. 24, using a pair of tensile-shear test pieces obtained by spot welding of the present invention.
Figure 28B:
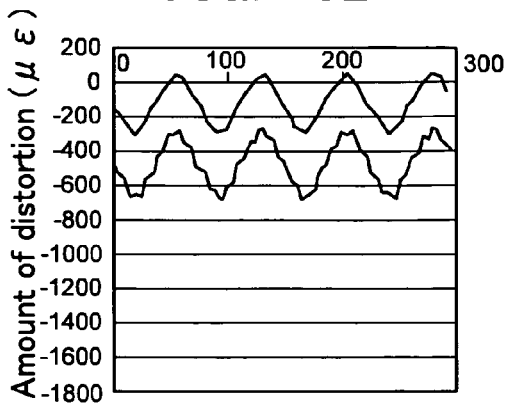
Figure 28C:
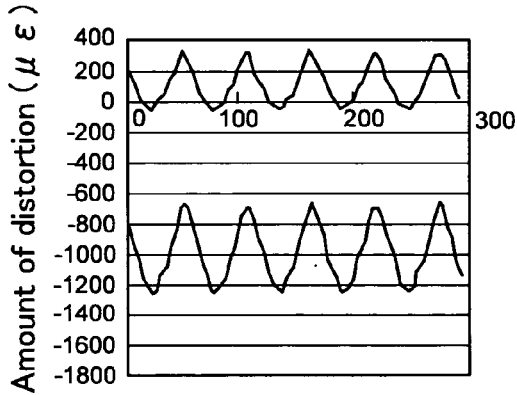
Figure 28D:
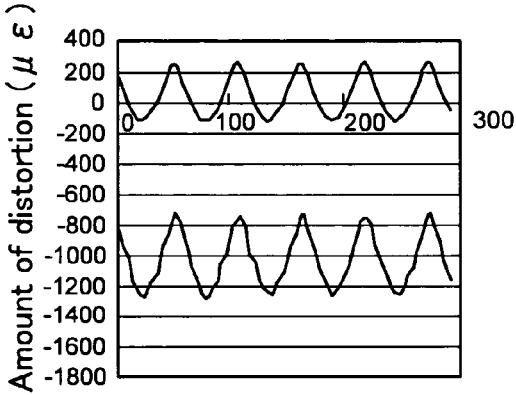
Figure 28E:
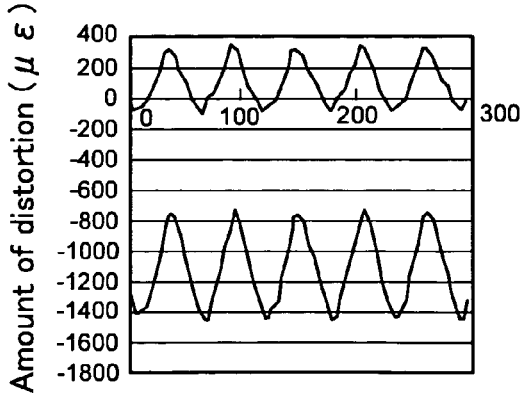
Figure 28F:
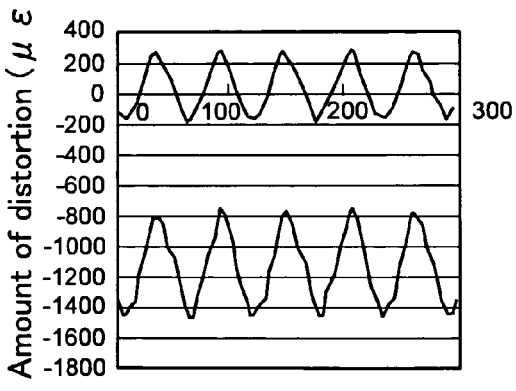

FIGS. 28A to 28F show alternating distortion waveforms generated in the pair of tensile-shear test pieces TS1 and TS2 (refer to FIG. 13) obtained by spot welding of the present invention. FIGS. 28A, 28C, and 28E show distortion waveforms of tensile-shear test piece TS1, and FIGS. 28B, 28D, and 28F show distortion waveforms of the tensile-shear test piece TS2. FIGS. 28A and 28B show distortion waveforms when a repeated load is 0.3 kN to 3.0 kN, FIGS. 28C and 28D show distortion waveforms when a repeated load is 0.4 kN to 4.0 kN, and FIG. 28E and 28F show distortion waveforms when a repeated load is 0.5 kN to 5.0 kN (refer to Table 3). In each of FIGS. 28A to 28F, an upper distortion waveform is a waveform measured with the distortion gauged G1 for measuring an amount of distortion in the direction L, and a lower distortion waveform is a waveform measured with the second distortion gauged G2 for measuring an amount of distortion in the direction C (refer to FIGS. 24A and 24B).

It is supposed that the test results shown in Table 3 and FIGS. 25 to 28F are due to difference in sheet separation. With conventional spot welding that increases separation, when a tensile load acts, a bending moment is larger, leading to greater amount of distortion in the vicinity of the melted nugget. Moreover, since greater difference in amount of distortion between spot-welded metal plates creates a tendency for distortion to incline toward one metal plate, it is supposed that the fatigue characteristics due to shear stress are degraded. On the other hand, with spot welding of the present invention, since a bending moment is smaller to cause smaller difference in amount of distortion of spot-welded metal plates, and the inclination of the amount of distortion of metal plates is smaller, it is supposed that the fatigue characteristics due to shear stress are enhanced.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the present invention is not to be considered to be limited by the foregoing description and is only limited by the scope of the appended claims.

What is claimed is:

1. A fuel-cell stack, comprising: a unit cell comprising an electrolyte/electrode structure having electrodes arranged on both sides of an electrolyte, the electrolyte/electrode structure being held by metal separators;
   a box-like casing that accommodates a laminate having the unit cells laminated, the casing comprising:
   a pair of end plates arranged at both ends of the laminate in a laminating direction,
   pairs of side plates arranged at sides of the laminate, the pairs of side plates being formed of a metal plate having a first thickness,
   a plurality of hinge plates welded to both ends of the pairs of side plates by spot welding, the plurality of hinge plates being formed of a metal plate having a second thickness greater than the first thickness, and a plurality of linking pins that link the pair of end plates and the plurality of hinge plates;

wherein one surface of each hinge plate that is in contact with a respective side plate is concave, and a surface of the respective side plate in contact with the hinge plate is convex; and the concave surface of each hinge plate is in contact with the convex surface of the respective side plate.

2. The fuel-cell stack as claimed in claim 1, wherein one surface of each side plate, opposite to another surface of the side plate that is in contact with a respective hinge plate, is concave.

3. The fuel-cell stack as claimed in claim 1, wherein the side plate and the hinge plate differ in thickness more than twice as much.

4. The fuel-cell stack as claimed in claim 3, wherein the side plate and the hinge plate are made of stainless steel.

5. The fuel-cell stack as claimed in claim 1, wherein the side plate and the hinge plate have the same thickness.

6. The fuel-cell stack as claimed in claim 5, wherein the side plate and the hinge plate are made of high tensile-strength steel.

7. The fuel-cell stack as claimed in claim 2, wherein the side plate and the hinge plate differ in thickness more than twice as much.

8. The fuel-cell stack as claimed in claim 7, wherein the side plate and the hinge plate are made of stainless steel.

9. The fuel-cell stack as claimed in claim 2, wherein the side plate and the hinge plate have the same thickness.

10. The fuel-cell stack as claimed in claim 9, wherein the side plate and the hinge plate are made of high tensile-strength steel.

* * * * *